(12) United States Patent
Kon et al.

(10) Patent No.: US 12,153,265 B2
(45) Date of Patent: Nov. 26, 2024

(54) FERRULE, OPTICAL CONNECTOR, AND OPTICAL CONNECTOR MODULE

(71) Applicant: Enplas Corporation, Saitama (JP)

(72) Inventors: Ayano Kon, Saitama (JP); Masato Nakamura, Saitama (JP); Takayuki Sukegawa, Saitama (JP); Yuto Kujirai, Saitama (JP)

(73) Assignee: Enplas Corporation, Saitama (JP)

( * ) Notice: Subject to any disclaimer, the term of this patent is extended or adjusted under 35 U.S.C. 154(b) by 170 days.

(21) Appl. No.: 17/708,391

(22) Filed: Mar. 30, 2022

(65) Prior Publication Data

US 2023/0314726 A1    Oct. 5, 2023

(51) Int. Cl.
   *G02B 6/38*        (2006.01)

(52) U.S. Cl.
   CPC ......... *G02B 6/3885* (2013.01); *G02B 6/3825* (2013.01)

(58) Field of Classification Search
   CPC ........................................................ G02B 6/38
   USPC ............................................................. 385/78
   See application file for complete search history.

(56) References Cited

U.S. PATENT DOCUMENTS

| | | | | |
|---|---|---|---|---|
| 6,307,982 B1 * | 10/2001 | Takahashi | ............ | G02B 6/3508 |
| | | | | 385/16 |
| 8,107,823 B2 * | 1/2012 | Ishii | ............... | G02B 6/4292 |
| | | | | 385/139 |
| 2014/0157872 A1 * | 6/2014 | Welland | ............ | G01N 15/0656 |
| | | | | 73/28.02 |
| 2014/0241671 A1 * | 8/2014 | Koreeda | ............... | G02B 6/381 |
| | | | | 385/78 |
| 2020/0064560 A1 * | 2/2020 | Leigh | ................ | G02B 6/3869 |
| 2021/0341687 A1 * | 11/2021 | Takaya | ................. | G02B 6/403 |
| 2022/0171140 A1 * | 6/2022 | Barthes | ................. | G02B 6/3831 |
| 2023/0204868 A1 * | 6/2023 | Baca | .................... | G02B 6/3869 |
| | | | | 385/60 |

FOREIGN PATENT DOCUMENTS

| JP | H05313078 A | * | 11/1993 | |
| JP | H11305080 A | * | 11/1999 | |
| JP | 2014-521966 A | | 8/2014 | |
| WO | WO-2015095169 A1 | * | 6/2015 | ............ G01B 11/14 |

* cited by examiner

*Primary Examiner* — Kaveh C Kianni
(74) *Attorney, Agent, or Firm* — Shih IP Law Group, PLLC

(57) ABSTRACT

The present invention relates to the provision of a ferrule that can be connected even when the space for the connection is small. A ferrule of the present invention is configured to hold a plurality of optical transmission members and to be connected to another ferrule. The ferrule includes a first surface facing the end of the optical transmission members when the optical transmission members are held; and a plurality of second surfaces disposed opposite to the first surface in the ferrule. In the ferrule, the optical transmission members extend in the Z direction, and the ferrule is configured to be moved in a direction orthogonal to the Z direction to be connected to the other ferrule.

11 Claims, 20 Drawing Sheets

FERRULE, OPTICAL CONNECTOR, AND OPTICAL CONNECTOR MODULE

TECHNICAL FIELD

The present invention relates to a ferrule, an optical connector, and an optical connector module.

BACKGROUND ART

A ferrule with an optical transmission member (for example, an optical fiber or an optical waveguide) disposed therein is known. A ferrule with an optical transmission member disposed therein serves as an optical connector and is used to achieve an optical connection.

For example, Patent Literature (hereinafter, referred to as PTL) 1 discloses an optical fiber assembly. The optical fiber assembly includes a ferrule body with plurality of optical fibers.

CITATION LIST

Patent Literature

PTL 1
Japanese Unexamined Patent Application Publication (Translation of PCT Application) No. 2014-521966

SUMMARY OF INVENTION

Technical Problem

For connecting the ferrule bodies disclosed in PTL 1 to each other, the ferrule bodies are placed so that the fronts thereof face each other, are moved to reduce the distance between the fronts (approach each other in the Z direction in the present invention), and are connected to each other. However, such a connection method needs a large space (footprint) for the connection.

An object of the present invention is to provide a ferrule that can be connected even when the space for the connection is small. Another object of the present invention is to provide an optical connector including the ferrule. Another object of the present invention is to provide an optical connector module including the optical connector.

Solution to Problem

A ferrule of the present invention is configured to hold a plurality of optical transmission members and to be connected to another ferrule. The ferrule of the present invention includes: a first surface facing an end of the plurality of optical transmission members when the plurality of optical transmission members are held; and a plurality of second surfaces disposed opposite to the first surface in the ferrule, in which
  the plurality of optical transmission members extend in a Z direction, and the ferrule is configured to be moved in a direction orthogonal to the Z direction to be connected to the other ferrule.

A ferrule of the present invention is configured to hold a plurality of optical transmission members and to be connected to another ferrule. The ferrule of the present invention includes: a first surface facing an end of the plurality of optical transmission members when the plurality of optical transmission members are held; and a plurality of second surfaces disposed opposite to the first surface in the ferrule, in which
  the plurality of second surfaces are arranged in an X direction, and the ferrule is configured to be moved in the X direction to be connected to the other ferrule.

An optical connector of the present invention includes the ferrule and optical transmission members.

An optical connector module of the present invention includes the optical connector, an elastic member for fixing a position of the optical connector, and an adapter for fixing a position of the elastic member.

Advantageous Effects of Invention

The present invention is capable of providing a ferrule that can be joined even when the space for the joining is small. The present invention is capable of providing an optical connector including the ferrule. The present invention is capable of providing an optical connector module including the optical connector.

DESCRIPTION OF EMBODIMENTS

Embodiment 1

Configurations of Optical Connector Module and Optical Connector

Figure 1A:
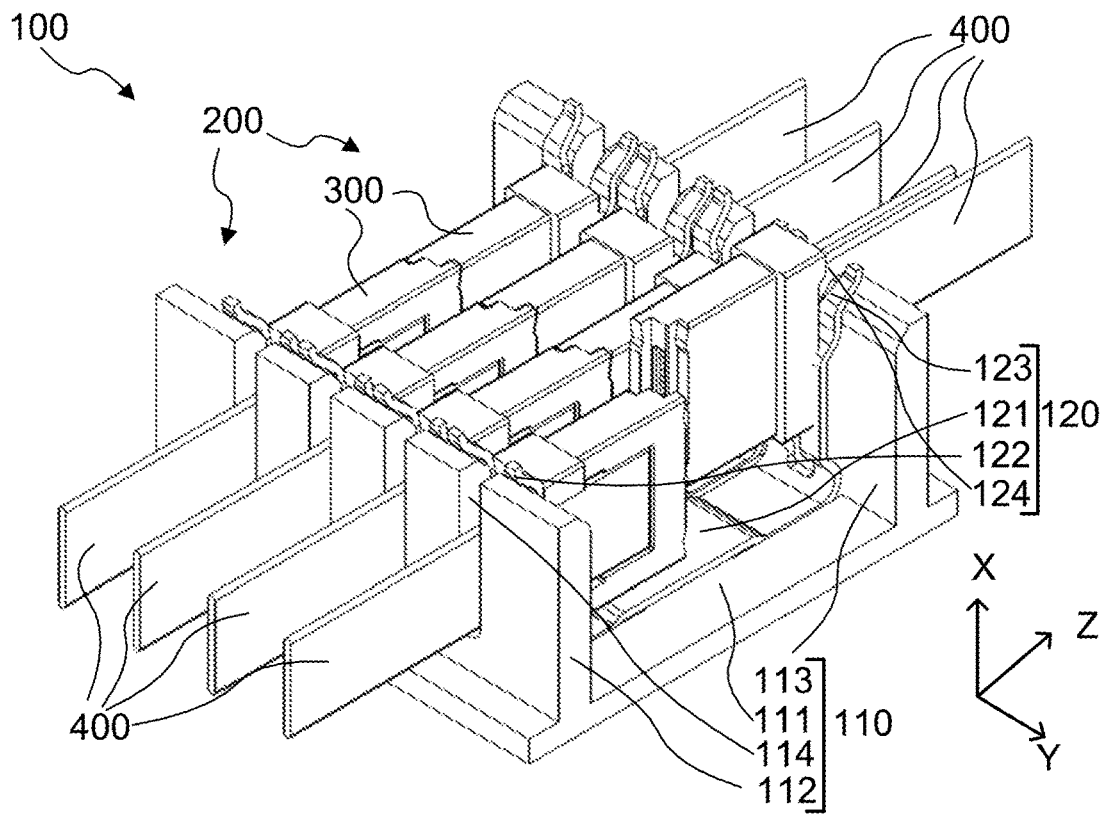
FIG. 1A is a perspective view of an optical connector module according to Embodiment 1.
Figure 1B:
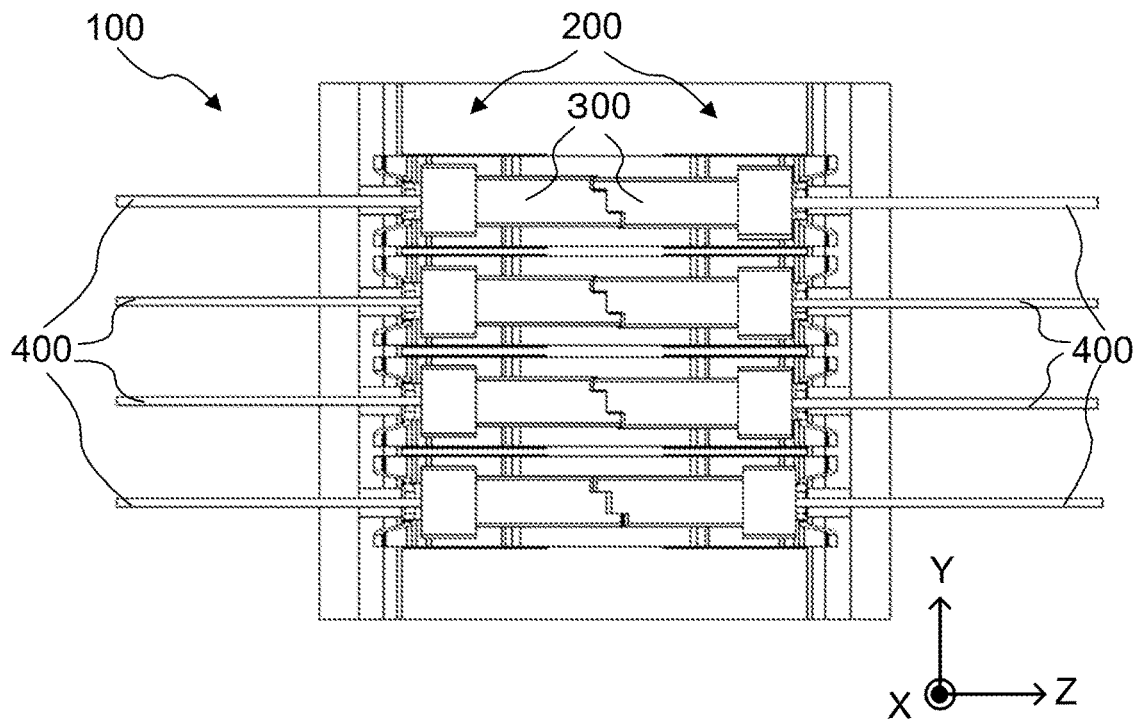
FIG. 1B is a plan view of the optical connector module.

FIG. 1A is a perspective view of optical connector module 100 according to Embodiment 1 of the present invention, and FIG. 1B is a plan view of the optical connector module.

As illustrated in FIGS. 1A and 1B, optical connector module 100 includes adapter 110, at least one elastic body 120, and optical connectors 200. Optical connector 200 includes ferrule 300 and at least one optical transmission member 400.

In the following description, the direction in which the plurality of second surfaces (described below) of ferrule 300 are arranged is the X direction, the direction perpendicular to the X direction when the ferrule is viewed from the front is the Y direction, and the direction (namely the direction in which optical transmission member 400 extends) perpendicular to the X direction and the Y direction is the Z direction. The front view means the view from the direction in which the second surfaces are visible.

As illustrated in FIGS. 1A and 1B, in optical connector module 100, adapter 110 fixes the position of elastic body 120, and fixed elastic body 120 fixes the positions of two optical connectors 200 (two ferrules 300 each including optical transmission member 400) in such a way that the fronts of optical connectors 200 face each other.

In optical connector 200, ferrule 300 includes one end of optical transmission member 400. By fixing two optical connectors 200 to each other at their fronts as described above, the ends of optical transmission members 400 are optically connected to each other.

Adapter 110 is a member located on the outermost side in the structure for fixing optical connector 200, and is a member for fixing elastic bodies 120. Adapter 110 is formed of a material that is harder than elastic body 120.

In the present embodiment, adapter 110 includes base 111 extending in the Z direction, and first wall 112 and second wall 113 each extending in the X direction from the base. Elastic body 120 is fixed between first wall 112 and second wall 113. In addition, first wall 112 and second wall 113 each includes at least one slit 114 for allowing optical transmission members to pass therethrough.

Elastic body 120 is a member located between adapter 110 and optical connectors 200, and is a member for fixing optical connectors 200 to each other. Elastic body 120 may have any configuration as long as the elastic body can apply forces from its both ends toward its center in the Z direction onto the two optical connectors.

In the present embodiment, elastic body 120 includes base plate 121 extending in the Z direction, and first plate 122 and second plate 123 each extending in the X direction from base plate 121. First plate 122 and second plate 123 push the respective rear sides of two optical connectors 200 disposed between the plates so that forces are applied in the direction in which the fronts of the optical connectors meet. In the present embodiment, elastic body 120 is a leaf spring, and one metal plate forms base plate 121, first plate 122, and second plate 123. In the present embodiment, first plate 122 and second plate 123 of elastic body 120 each includes at least one slit 124 for allowing optical transmission members 400 to pass therethrough.

Two optical connectors 200 in the foreground in FIG. 1A illustrates a state in which the fronts of ferrules 300 in two optical connectors 200 are being joined to each other. As FIG. 1A illustrates, ferrule 300 is configured to be joined to another ferrule by moving at least one of the ferrules in the X direction. This configuration of the present invention can substantially eliminate a space for allowing the fronts of two ferrules to face each other during the joining (space for moving the ferrule in the Z direction). The configuration of ferrule 300 will be described below.

Optical transmission members 400 are held by ferrule 300 described above. Any member capable of transmitting light may be used as optical transmission member 400. Examples of optical transmission member 400 include optical fibers and optical waveguides. In the present embodiment, optical transmission member 400 is an optical fiber. In the present embodiment, a plurality of optical fibers are bundled in a row by a covering part to form a ribbon.

Configuration of Ferrule

Figure 2:
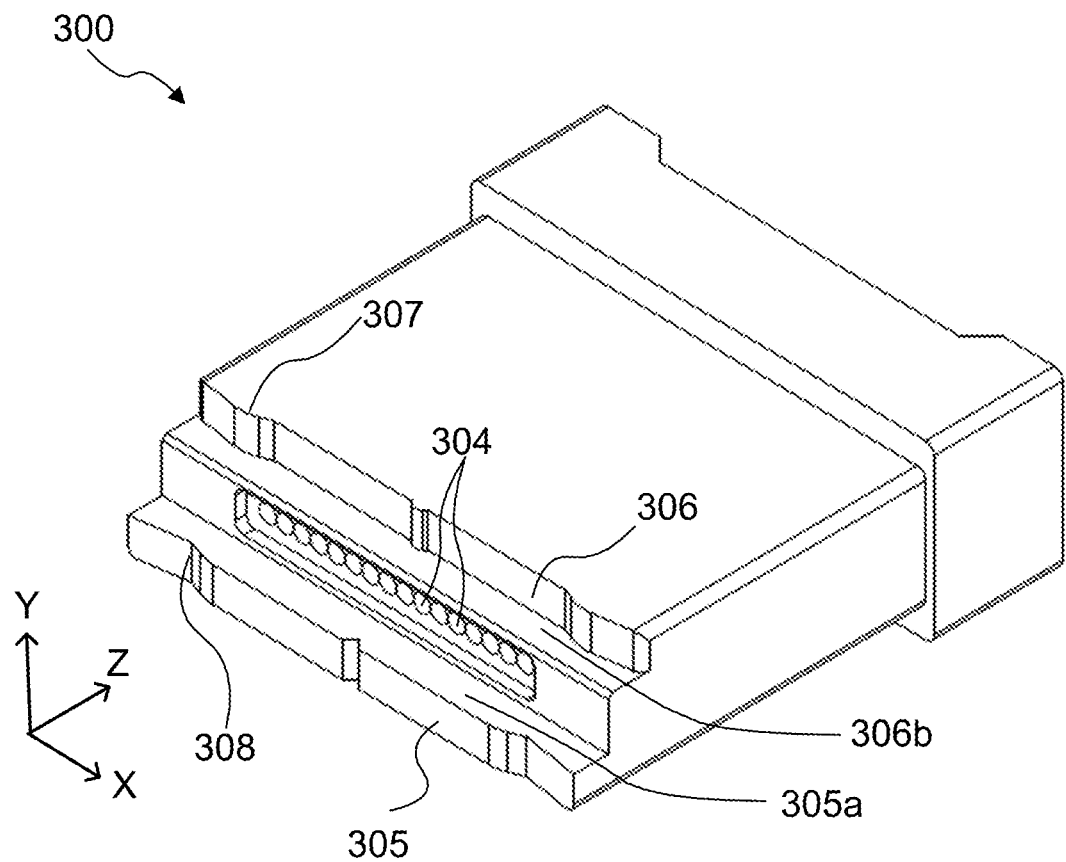
FIG. 2 is a perspective view of a ferrule according to Embodiment 1.
Figure 3A:
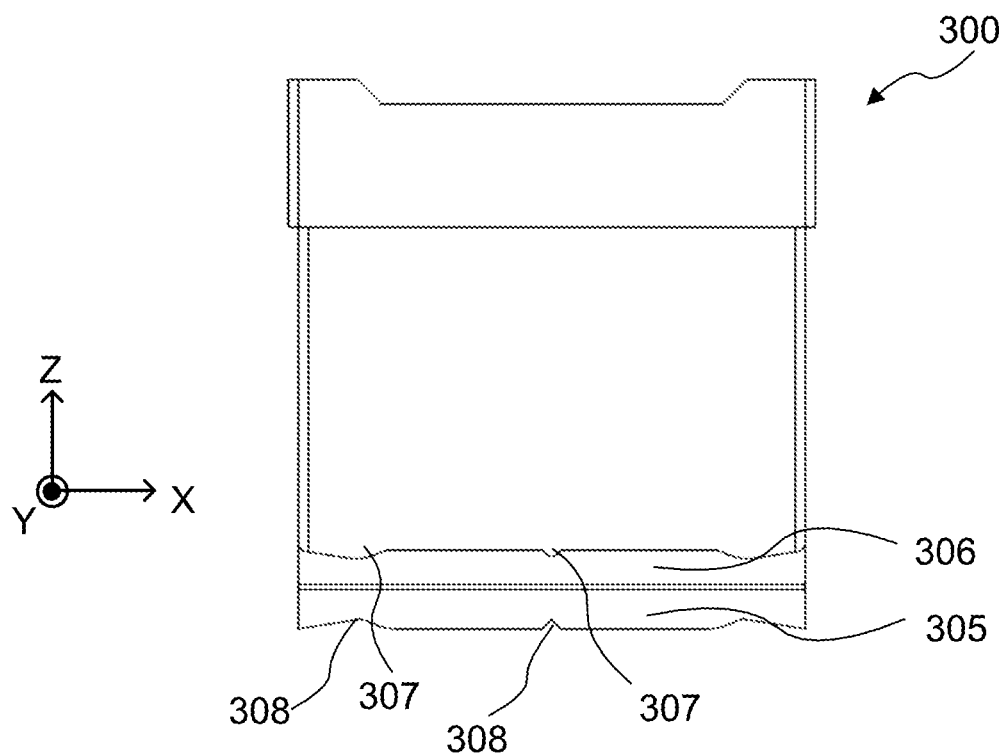
FIG. 3A is a plan view of the ferrule according to Embodiment 1.
Figure 3B:
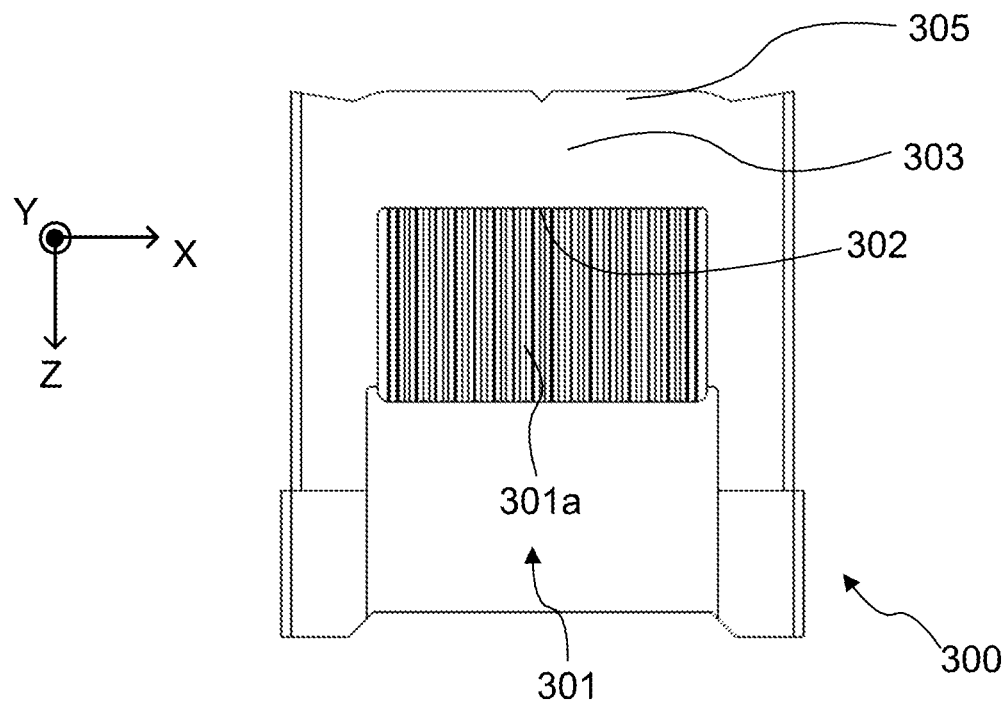
FIG. 3B is a bottom view of the ferrule.
Figure 4A:
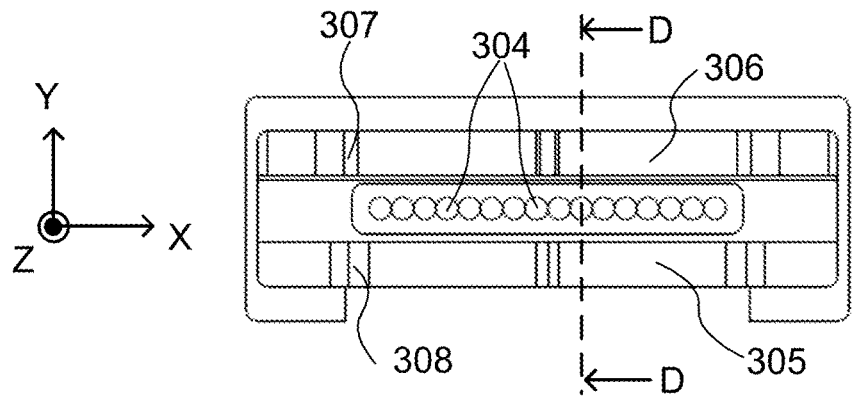
FIG. 4A is a front view of the ferrule according to Embodiment 1.
Figure 4B:
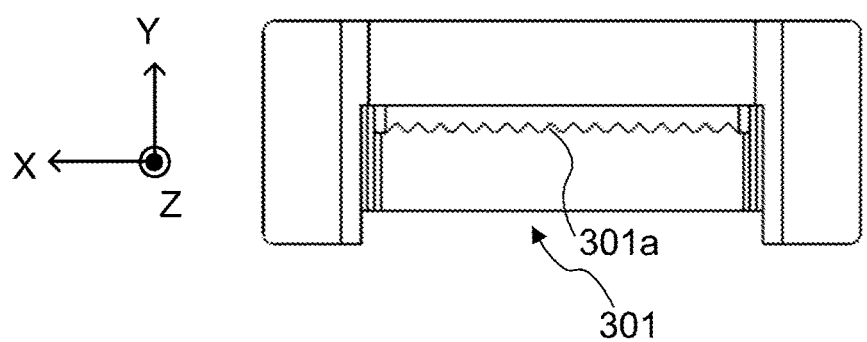
FIG. 4B is a rear view of the ferrule.
Figure 4C:
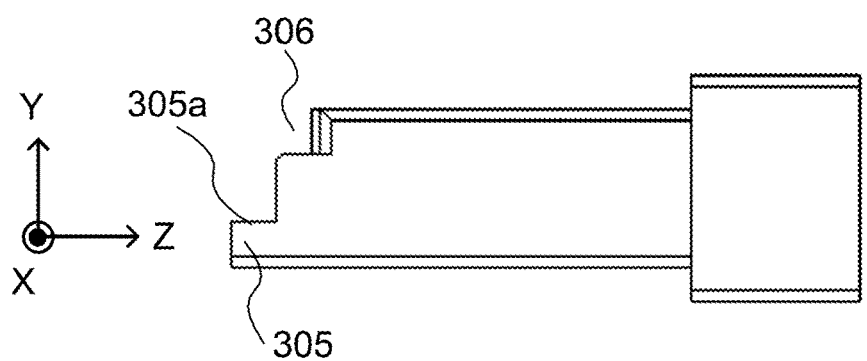
FIG. 4C is a right side view of the ferrule.
Figure 4D:
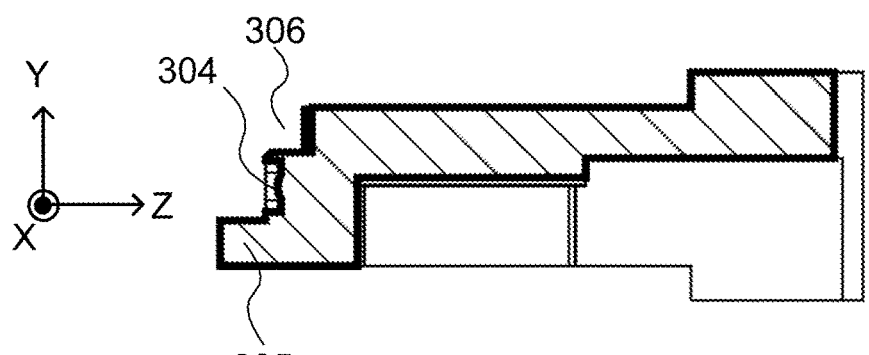
FIG. 4D is a cross-sectional view of the ferrule.

FIG. 2 is a perspective view of ferrule 300 according to Embodiment 1. FIG. 3A is a plan view of ferrule 300, and FIG. 3B is a bottom view of ferrule 300. FIG. 4A is a front view of the ferrule according to Embodiment 1, FIG. 4B is a rear view of the ferrule, FIG. 4C is a right side view of the ferrule, and FIG. 4D is a cross-sectional view taken along line D-D shown in FIG. 4A.

As illustrated in FIG. 2, ferrule 300 has a substantially rectangular parallelepiped shape. Ferrule 300 includes optical transmission member holding part 301, first surface 302, light transmitting wall 303, at least one second surface 304, engaging protrusion 305, engaging recess 306, at least one positioning protrusion 307, and at least one positioning recess 308.

As illustrated in FIG. 3B, optical transmission member holding part 301 is for holding optical transmission members 400. Optical transmission member holding part 301 may have any configuration as long as the part can hold optical transmission members 400. In the present embodiment, optical transmission member holding part 301 includes grooves 301a where optical transmission members 400 are to be disposed. As illustrated in FIG. 3B, groove 301a extends perpendicularly to the first surface 302 when viewed from the bottom. Examples of groove 301a include V-grooves and U-grooves. Grooves 301a are configured to allow the end face of optical transmission members 400 to be disposed at an appropriate position with respect to first surface 302 when optical transmission members 400 are disposed. The number of grooves 301a may be appropriately set according to the number of optical transmission members 400. In the present embodiment, the number of grooves 301a is 16 according to the number of optical transmission members (optical fibers) 400. In addition, in the present embodiment, a lid is disposed on optical transmission members 400 disposed in grooves 301a, and optical transmission members 400 are held between grooves 301a and the lid.

First surface 302 directly faces the end of optical transmission members 400. First surface 302 has the following configuration: light from optical transmission members 400 is incident on first surface 302, or light incident from second surface 304 is emitted from first surface 302 toward optical transmission members 400. First surface 302 is disposed on light transmitting wall 303 at the surface opposite to second surface 304. In the present embodiment, first surface 302 is parallel to the XY plane.

Light transmitting wall 303 allows transmission of light, and includes first surface 302 at one surface and second surface 304 at the other surface. Light incident on light transmitting wall 303 from first surface 302 or second surface 304 passes through light transmitting wall 303.

Second surface 304 is on light transmitting wall 303 and faces first surface 302. Second surface 304 has the following configuration: light incident from first surface 302 and traveling inside ferrule 300 is emitted from second surface 304, or light incident on second surface 304 travels inside ferrule 300 toward first surface 302. Second surface 304 may be a flat surface or a curved surface. Second surface 304 is preferably an optical control surface. In the present embodiment, second surface 304 is a curved surface, and more specifically, a convex lens. Ferrule 300 may include one second surface 304 or plurality of second surfaces 304. In the present embodiment, there are 16 second surfaces 304, which are convex lenses, according to the number of optical transmission members (optical fibers) 400. In addition, in the present embodiment, second surfaces 304 are arranged in a row along the X direction.

As illustrated in FIG. 2, engaging protrusion 305 is a structure that protrudes from the front of ferrule 300 and extends in the X direction. As illustrated in FIGS. 1A and 1B, engaging protrusion 305 serves as a guide, together with engaging recess 306 of the other ferrule that faces ferrule 300, for moving ferrule 300 in the X direction (in this case, the other ferrule is ferrule 300 facing ferrule 300 because ferrules 300 having the same shape are connected to each other in the present embodiment). Engaging protrusion 305 functions to fix the ferrules with respect to the Y direction after the joining. Engaging protrusion 305 may have any configuration as long as engaging protrusion 305 can exhibit these functions. In other words, engaging protrusion 305 has a shape substantially complementary to that of engaging recess 306 of the other ferrule (namely, ferrule 300) which faces ferrule 300 (herein also referred to as "the other facing ferrule"), and is disposed at a position substantially complementary to that of engaging recess 306.

As illustrated in FIG. 4A, engaging protrusion 305 is disposed apart from engaging recess 306 in the Y direction. Specifically, in the present embodiment, engaging protrusion 305 and engaging recess 306 are disposed apart from each other in the Y direction in such a way that plurality of second surfaces 304 arranged in the X direction are placed therebetween. In addition, in the present embodiment, engaging protrusion 305 has a substantially rectangular parallelepiped shape long in the X direction. Engaging protrusion 305 may extend over the entire length of ferrule 300 from one end to the other end in the X direction, or may extend over only a part of the entire length. In the present embodiment, engaging protrusion 305 extends over the entire length.

As illustrated in FIG. 2, engaging protrusion 305 includes inward restricting surface 305a. On engaging protrusion 305, inward restricting surface 305a faces the inside (second surface side) of the ferrule. Inward restricting surface 305a contacts outward restricting surface 306b (described below) of engaging recess 306 of the other facing ferrule (ferrule 300) to restrict the movement of ferrule 300 in the Y direction.

As described above, engaging recess 306 has a shape substantially complementary to that of engaging protrusion 305 of the other facing ferrule (ferrule 300), and is disposed at a position substantially complementary to that of engaging protrusion 305.

As illustrated in FIG. 2, engaging recess 306 is depressed from the front of ferrule 300 and extends in the X direction. Engaging recess 306 is disposed apart from engaging protrusion 305 in the Y direction. Specifically, in the present embodiment, engaging recess 306 and engaging protrusion 305 are disposed apart from each other in the Y direction in such a way that second surfaces 304 arranged in the X direction are placed therebetween. In addition, in the present embodiment, engaging recess 306 has a substantially rectangular parallelepiped shape long in the X direction. Engaging recess 306 may extend over the entire length of ferrule 300 from one end to the other end, or may extend over only a part of the entire length. In the present embodiment, engaging recess 306 extends over the entire length.

As illustrated in FIG. 2, engaging recess 306 includes outward restricting surface 306b. In engaging recess 306, outward restricting surface 306b faces the outside of ferrule 300. Outward restricting surface 306b contacts inward restricting surface 305a of engaging protrusion 305 of the other facing ferrule (ferrule 300) to restrict the movement of the ferrule in the Y direction.

Positioning protrusion 307 is, together with positioning recess 308 in the other facing ferrule (ferrule 300), for fixing the position of the ferrule in the X direction. Positioning protrusion 307 is smaller than the engaging protrusion. Positioning protrusion 307 has a shape substantially complementary to that of positioning recess 308 in the other facing ferrule, and is disposed at a position substantially complementary to that of positioning recess 308.

In the present embodiment, positioning protrusion 307 is disposed at the front of ferrule 300. Specifically, in the present embodiment, positioning protrusion 307 is disposed at the front of engaging recess 306 (see FIG. 3A).

Positioning recess 308 is, together with positioning protrusion 307 in the other facing ferrule (ferrule 300), for fixing the position of ferrule 300 in the X direction. Positioning recess 308 is smaller than engaging recess 306. Positioning recess 308 has a shape substantially complementary to that of positioning protrusion 307 in the other facing ferrule, and is disposed at a position substantially complementary to that of positioning protrusion 307.

In the present embodiment, positioning recess 308 is disposed at the front of ferrule 300. Specifically, in the present embodiment, positioning recess 308 is disposed at the front of engaging protrusion 305 (see FIG. 3A).

Connection Method

Figure 5:
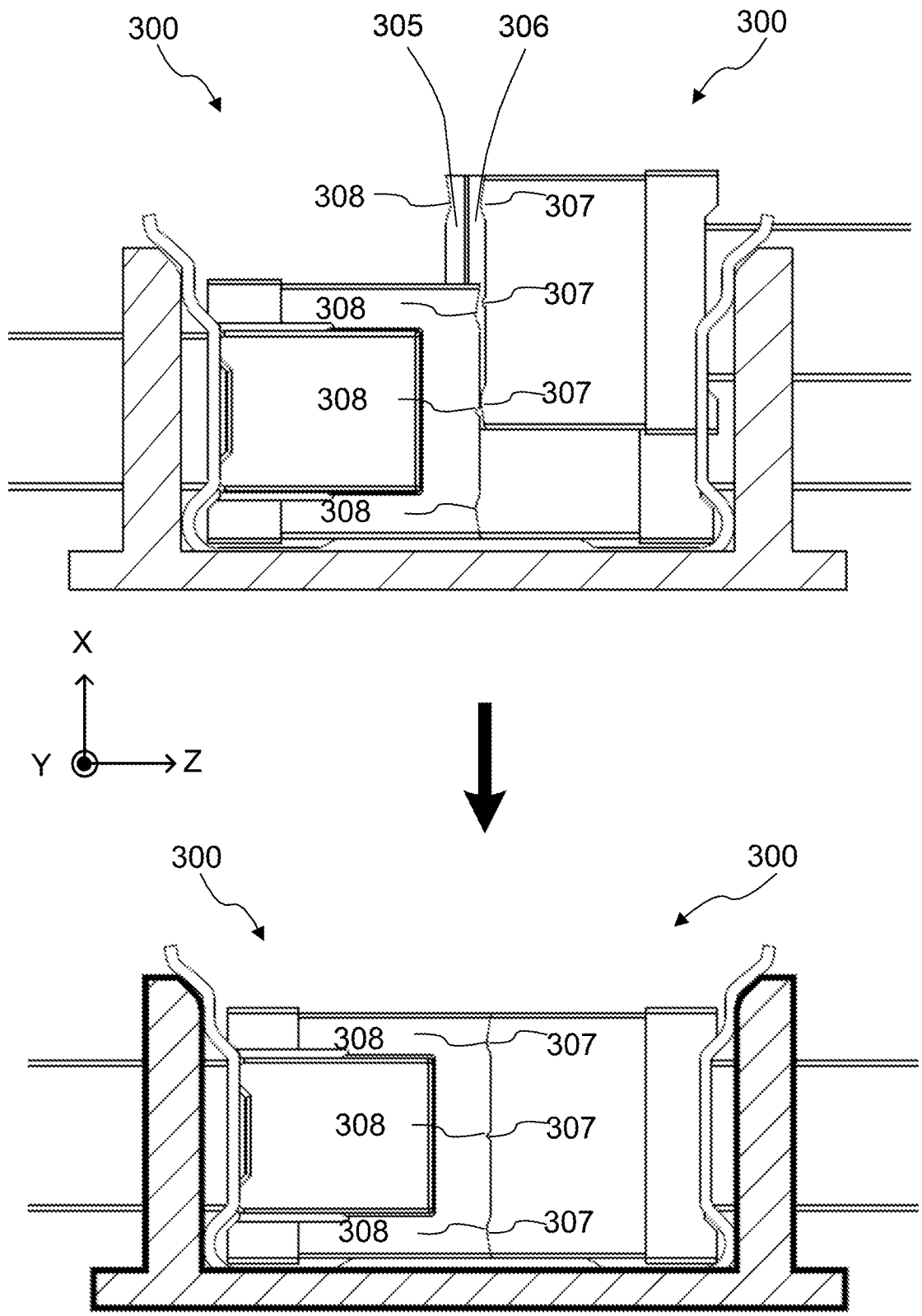
FIG. 5 illustrates how to connect the ferrules according to Embodiment 1 to each other.

FIG. 5 illustrates a process in which ferrule 300 is connected to another ferrule (a process in which ferrules 300 are connected to each other). As illustrated in FIG. 5, the ferrules can be joined to each other by fixing one of ferrules 300 and moving the other ferrule in the X direction.

While ferrule 300 is moved, engaging protrusion 305 of ferrule 300 moves so as to slide along engaging recess 306 of the other ferrule, and engaging recess 306 of ferrule 300 moves so as to slide along engaging protrusion 305 of the other ferrule. In other words, engaging protrusion 305 and engaging recess 306 serve as guides for preventing misalignment in the Y direction when ferrule 300 is moved in the X direction.

In the joined state, positioning protrusion 307 and positioning recess 308 engage with each other to fix the ferrules with respect to the X direction. In addition, in the joined state, ferrule 300 is fixed with respect to the Y direction by inward restricting surface 305a of engaging protrusion 305 and outward restricting surface 306b of engaging recess 306. Specifically, in FIG. 5, ferrule 300 on the right side is fixed with respect to one direction, that is from the back to the front of the drawing, in the Y direction.

In the above description, the ferrules are connected to each other by moving one of the ferrules in the X direction as an example. However, the direction in which the ferrule is moved may be any direction perpendicular to the Z direction. In other words, the ferrule may be moved in the Y direction to be connected to each other.

Effects

Ferrule 300 according to the present embodiment includes engaging protrusion 305 and engaging recess 306, which extend in the X direction and are disposed apart from each other in the Y direction. This configuration can connect ferrules 300 to each other by moving at least one ferrule 300 in the X direction. As a result, ferrules 300 can be connected to each other even in a small space.

Embodiment 2

Configuration of Ferrule

In an optical connector module and an optical connector according to Embodiment 2, only the configuration of a ferrule is different from the optical connector module and the optical connector according to Embodiment 1. Therefore, only ferrule 310 according to Embodiment 2 will be described in the following description. Regarding ferrule 310 according to Embodiment 2, the same components as those of ferrule 300 according to Embodiment 1 are designated by the same reference numerals and the description thereof will be omitted.

Figure 6:
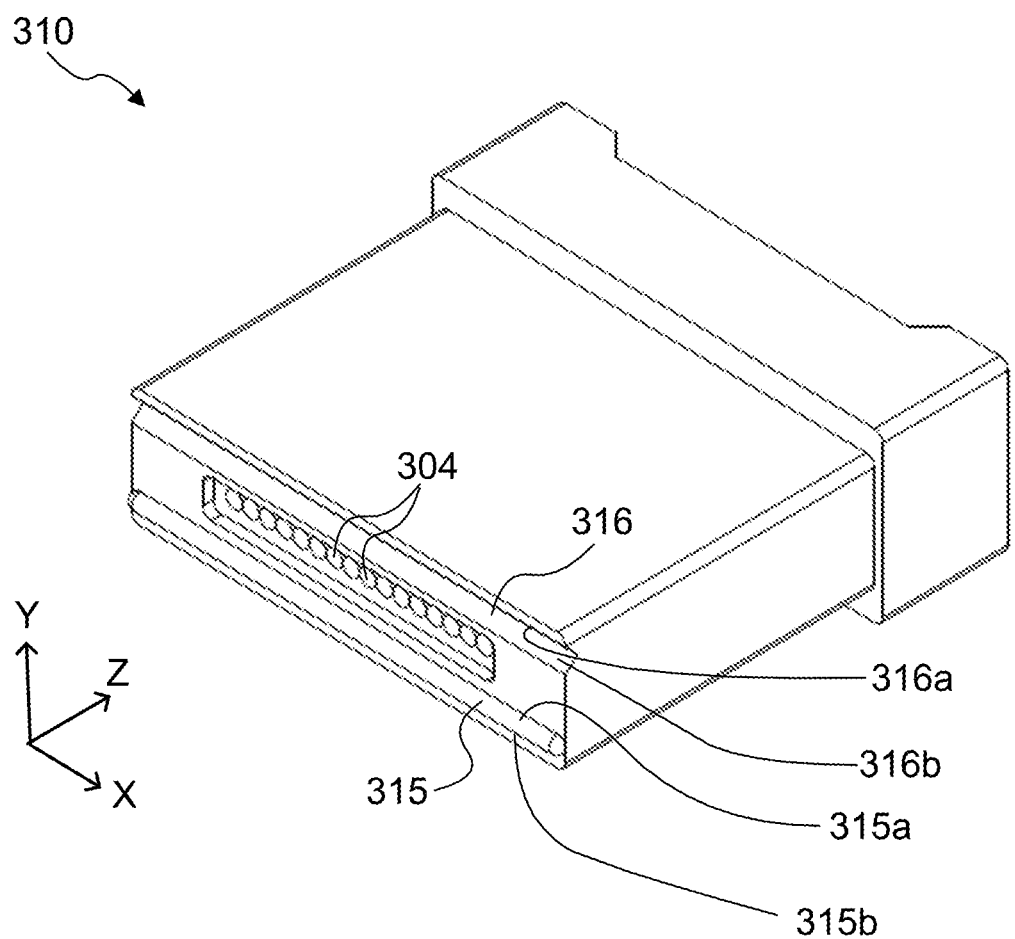
FIG. 6 is a perspective view of a ferrule according to Embodiment 2.
Figure 7A:
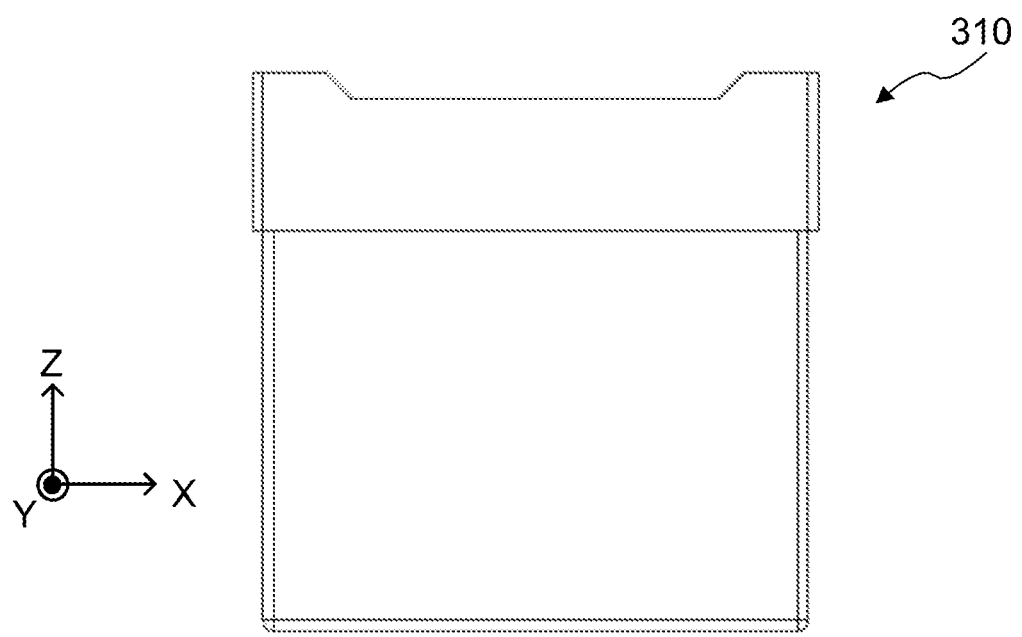
FIG. 7A is a plan view of the ferrule according to Embodiment 2.
Figure 7B:
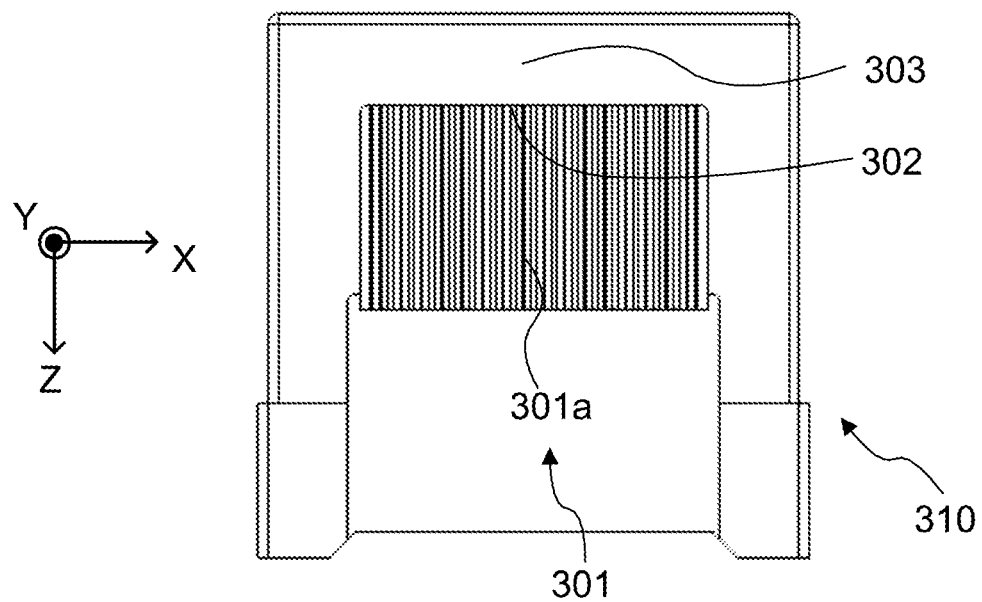
FIG. 7B is a bottom view of the ferrule.
Figure 8A:
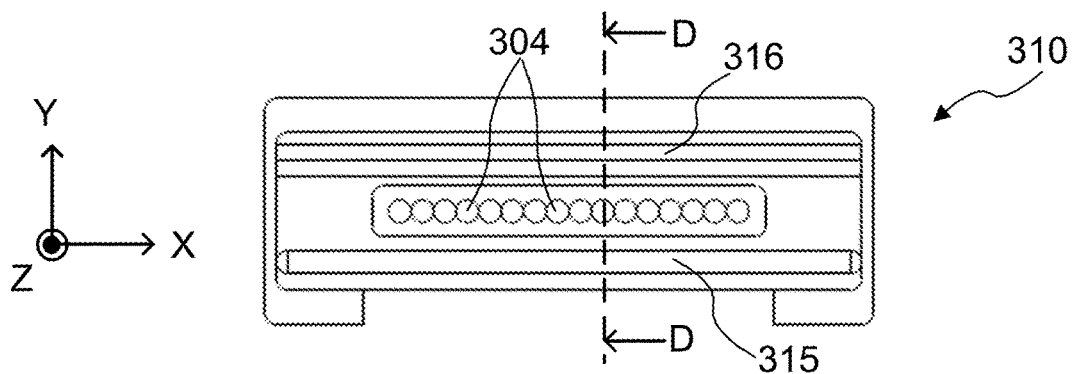
FIG. 8A is a front view of the ferrule according to Embodiment 2.
Figure 8B:
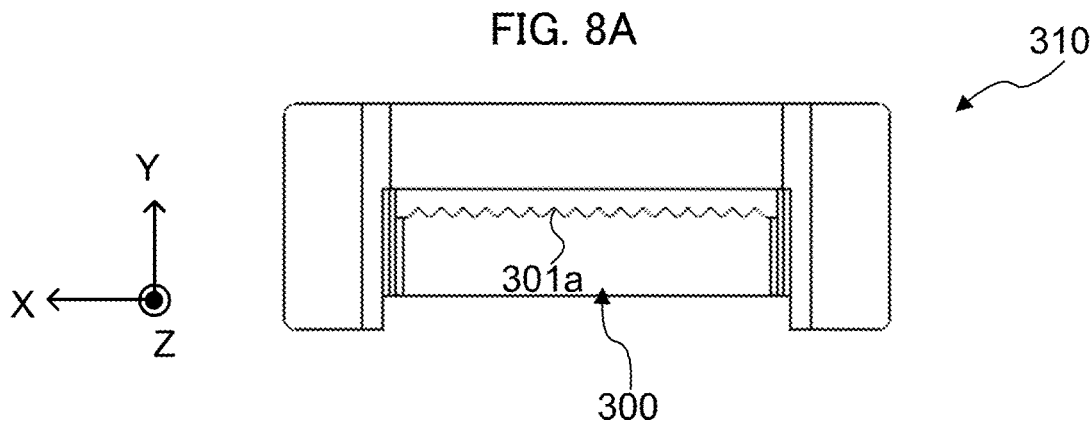
FIG. 8B is a rear view of the ferrule.
Figure 8C:
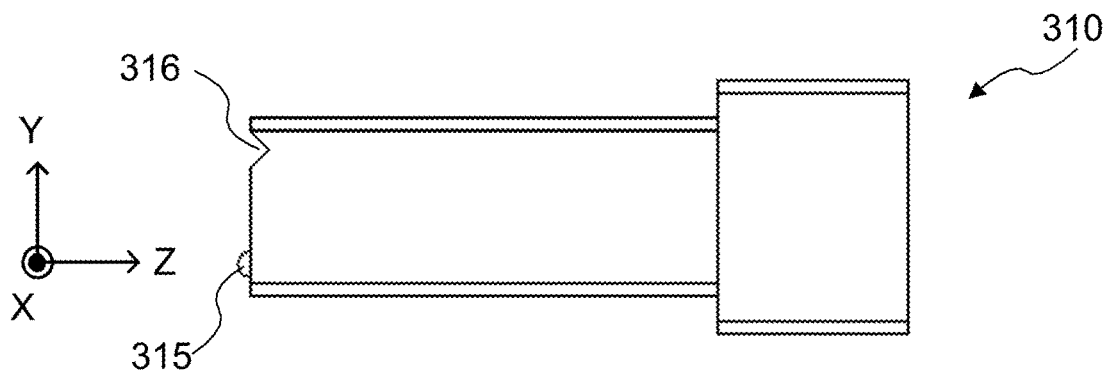
FIG. 8C is a right side view of the ferrule.
Figure 8D:
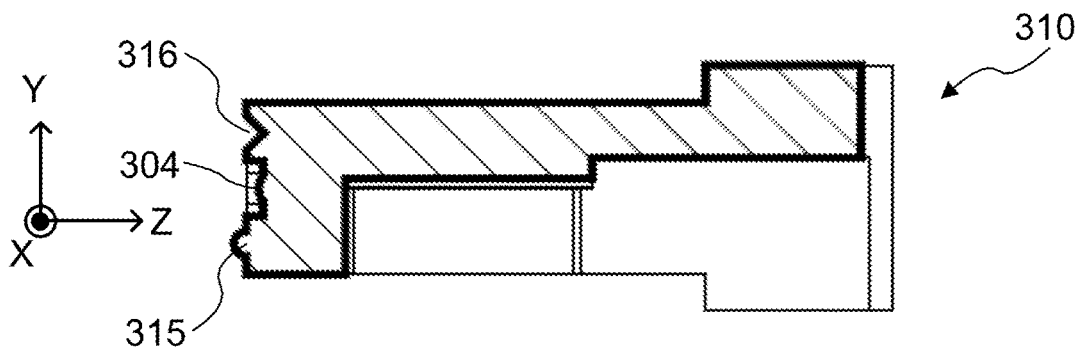
FIG. 8D is a cross-sectional view of the ferrule.

FIG. 6 is a perspective view of ferrule 310 according to Embodiment 2. FIG. 7A is a plan view of the ferrule and FIG. 7B is a bottom view of the ferrule. FIG. 8A is a front view of ferrule 310 according to Embodiment 2, FIG. 8B is a rear view of the ferrule, FIG. 8C is a right side view of the ferrule, and FIG. 8D is a cross-sectional view taken along line D-D shown in FIG. 8A.

Ferrule 310 according to Embodiment 2 includes engaging protrusion 315 and engaging recess 316. Engaging protrusion 315 and engaging recess 316 differ in the configuration thereof from engaging protrusion 305 and engaging recess 306 in ferrule 300 according to Embodiment 1. In the following, engaging protrusion 315 and engaging recess 316 will be described.

Engaging protrusion 315 has a shape substantially complementary to that of engaging recess 316 of the other facing ferrule (ferrule 310), and is disposed at a position substantially complementary to that of engaging recess 316.

Specifically, as illustrated in FIG. 6, engaging protrusion 315 is a structure that protrudes from the front of ferrule 310 and extends in the X direction. Engaging protrusion 315 serves as a guide, together with engaging recess 316 of the other ferrule that faces ferrule 310, for moving the ferrule in the X direction (in this case, the other ferrule is ferrule 310 because ferrules 310 having the same shape are joined to each other in the present embodiment). Engaging protrusion 315 functions to fix the ferrules with respect to the Y direction after the joining.

Engaging protrusion 315 is disposed apart from engaging recess 316 in the Y direction. Specifically, in the present embodiment, engaging protrusion 315 and engaging recess 316 are disposed apart from each other in the Y direction in such a way that plurality of second surfaces 304 arranged in the X direction are placed therebetween. In addition, in the present embodiment, engaging protrusion 315 has a semi-cylindrical shape long in the X direction. Engaging protrusion 315 may extend over the entire length of ferrule 310 from one end to the other end in the X direction, or may extend over only a part of the entire length. In the present embodiment, engaging protrusion 315 extends over the entire length.

Engaging protrusion 315 includes inward restricting surface 315a and outward restricting surface 315b.

On engaging protrusion 315, inward restricting surface 315a faces the inside (second surface 304 side) of the ferrule. Inward restricting surface 315a contacts outward restricting surface 316b (described below) of engaging recess 316 of the other facing ferrule (ferrule 310) to restrict the movement of ferrule 310 in the Y direction.

On engaging protrusion 315, outward restricting surface 315b faces the outside of ferrule 310. Outward restricting surface 315b contacts inward restricting surface 316a (described below) of engaging recess 316 of the other facing ferrule (ferrule 310) to restrict the movement of ferrule 310 in the Y direction.

As described above, engaging recess 316 has a shape substantially complementary to that of engaging protrusion 315 of the other facing ferrule (ferrule 310), and is disposed at a position substantially complementary to that of engaging protrusion 315.

As illustrated in FIG. 6, engaging recess 316 is depressed from the front of ferrule 310 and extends in the X direction. Engaging recess 316 is disposed apart from engaging protrusion 315 in the Y direction. Specifically, in the present embodiment, engaging recess 316 and engaging protrusion 315 are disposed apart from each other in the Y direction in such a way that second surfaces 304 arranged in the X direction are placed therebetween. In addition, in the present embodiment, engaging recess 316 has a V-groove shape extending in the X direction. Engaging recess 316 may extend over the entire length of ferrule 310 from one end to the other end, or may extend over only a part of the entire length. In the present embodiment, engaging recess 316 extends over the entire length.

Engaging recess 316 includes inward restricting surface 316a and outward restricting surface 316b.

In engaging recess 316, inward restricting surface 316a faces the inside (second surface 304 side) of the ferrule. Inward restricting surface 316a contacts outward restricting surface 315b of the engaging protrusion of the other facing ferrule (ferrule 310) to restrict the movement of the ferrule in the Y direction.

In engaging recess 316, outward restricting surface 316b faces the outside of ferrule 310. Outward restricting surface 316b contacts inward restricting surface 315a of engaging protrusion 315 of the other facing ferrule (ferrule 310) to restrict the movement of the ferrule in the Y direction.

In addition, ferrule 310 may include positioning protrusion 307 and positioning recess 308 as described in Embodiment 1.

Connection Method

Figure 9:
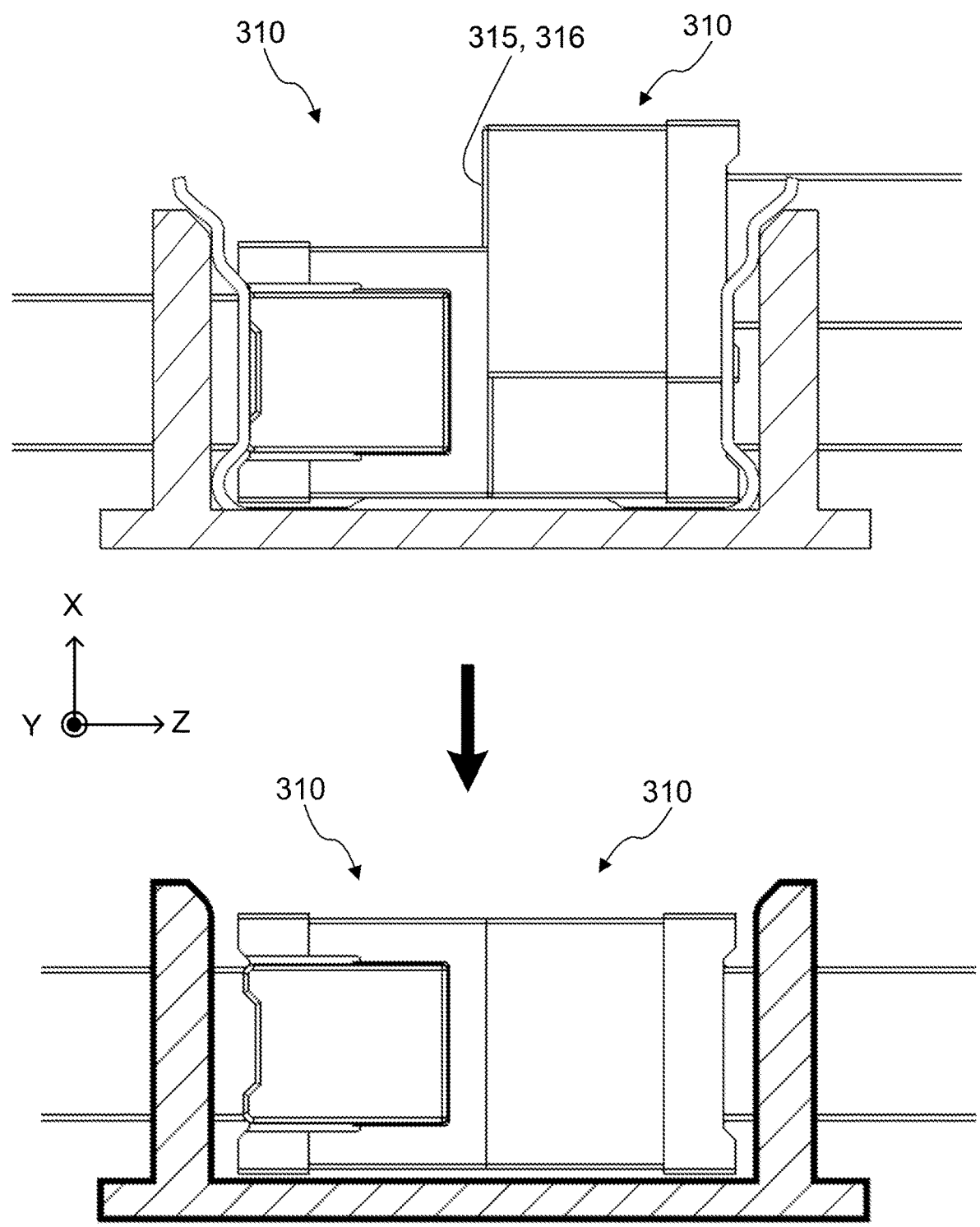
FIG. 9 illustrates how to connect the ferrules according to Embodiment 2 to each other.

FIG. 9 illustrates a process in which ferrule 310 is connected to another ferrule (a process in which ferrules 310 are connected to each other at the fronts thereof). In the lower drawing of FIG. 9, elastic body 120 is omitted. As illustrated in FIG. 9, ferrules 310 can be joined to each other by fixing one of ferrules 310 and moving the other ferrule in the X direction.

While ferrule 310 is moved, engaging protrusion 315 of ferrule 310 moves so as to slide along engaging recess 316 of the other ferrule, and engaging recess 316 of ferrule 310 moves so as to slide along engaging protrusion 315 of the other ferrule. In other words, engaging protrusion 315 and engaging recess 316 serve as guides for preventing misalignment in the Y direction when ferrule 310 is moved in the X direction.

In the joined state, ferrules 310 are fixed with respect to the Y direction by inward restricting surfaces and outward restricting surfaces of engaging protrusion 315 and engaging recess 316. Specifically, in FIG. 9, ferrule 300 on the right side is fixed with respect to two direction, that is, the direction from the back to the front of the drawing, and the direction opposite thereto. The reason for the restriction in the both direction is that engaging protrusion 315 includes both inward restricting surface 315a and outward restricting surface 315b, and engaging recess 316 also includes both inward restricting surface 316a and outward restricting surface 316b as described above.

In the above description, the ferrules are connected to each other by moving one of the ferrules in the X direction as an example. However, the direction in which the ferrule is moved may be any direction orthogonal to the Z direction. In other words, the ferrule may be moved in the Y direction.

Effects

Ferrule 310 according to the present embodiment has the same effects as ferrule 300 according to Embodiment 1. Further, ferrule 310 can be fixed in both directions with respect to the Y direction.

Embodiment 3

Configuration of Ferrule

In an optical connector module and an optical connector according to Embodiment 3, only the configuration of a ferrule is different from the optical connector module and the optical connector according to Embodiment 1. Therefore, only ferrule 320 according to Embodiment 3 will be described in the following description. Regarding ferrule 320 according to Embodiment 3, the same components as those of ferrule 300 according to Embodiment 1 are designated by the same reference numerals and the description thereof will be omitted.

Figure 10:
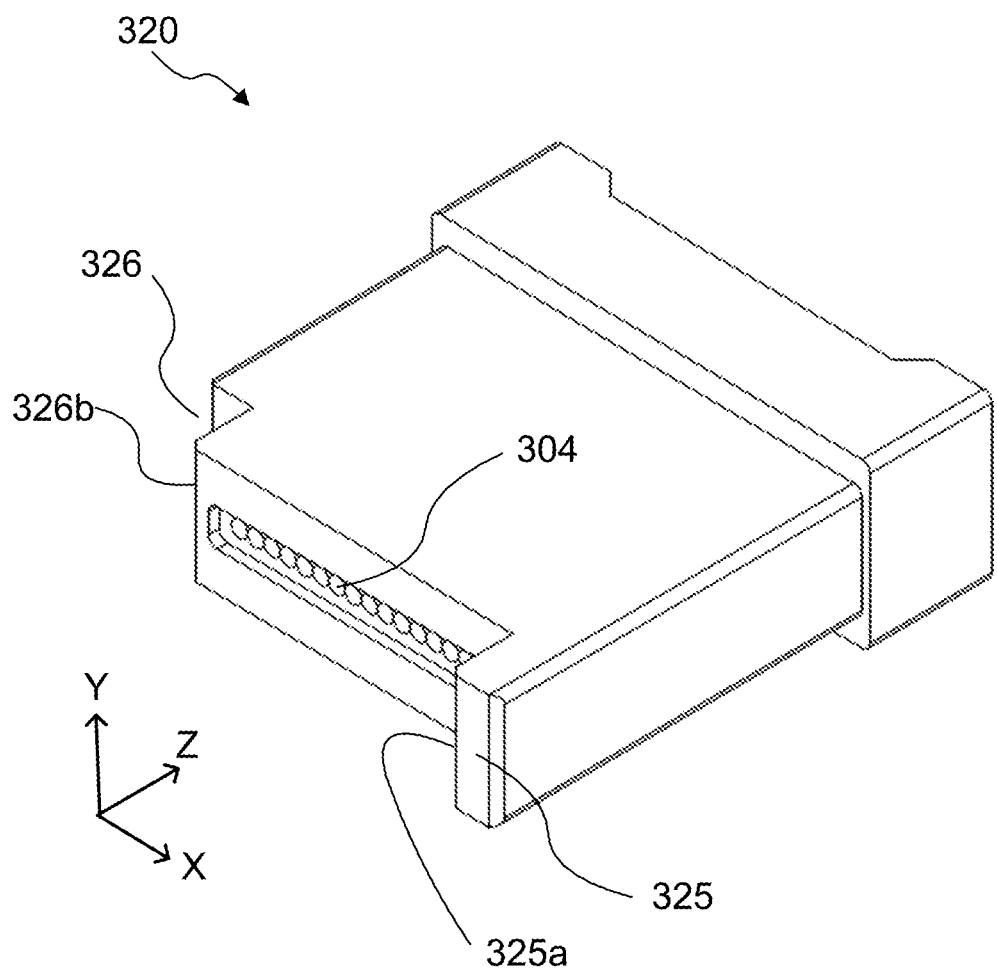
FIG. 10 is a perspective view of a ferrule according to Embodiment 3.
Figure 11A:
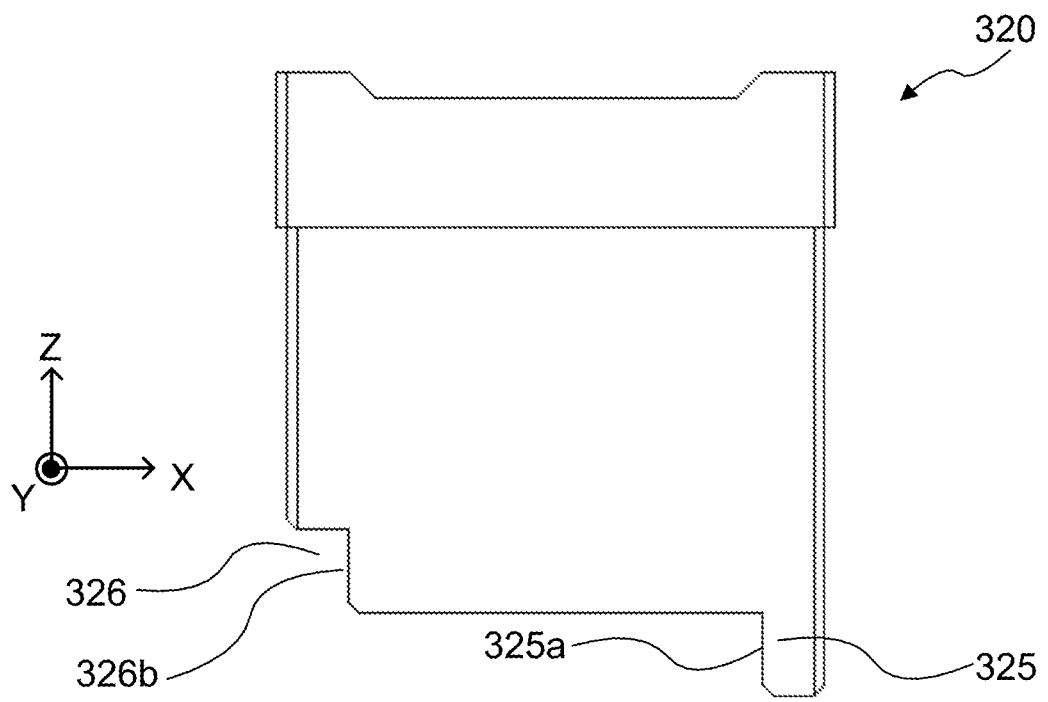
FIG. 11A is a plan view of the ferrule according to Embodiment 3.
Figure 11B:
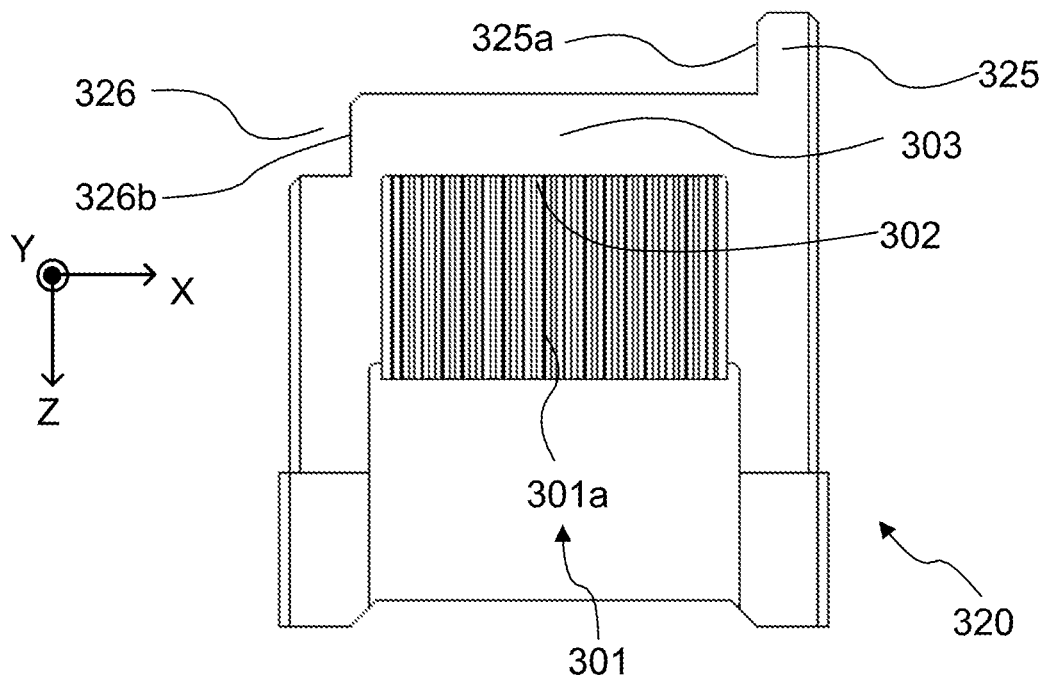
FIG. 11B is a bottom view of the ferrule.
Figure 12A:
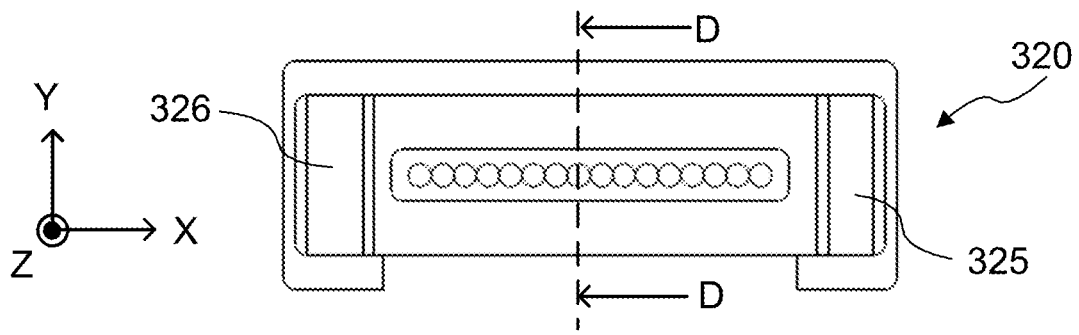
FIG. 12A is a front view of the ferrule according to Embodiment 3.
Figure 12B:
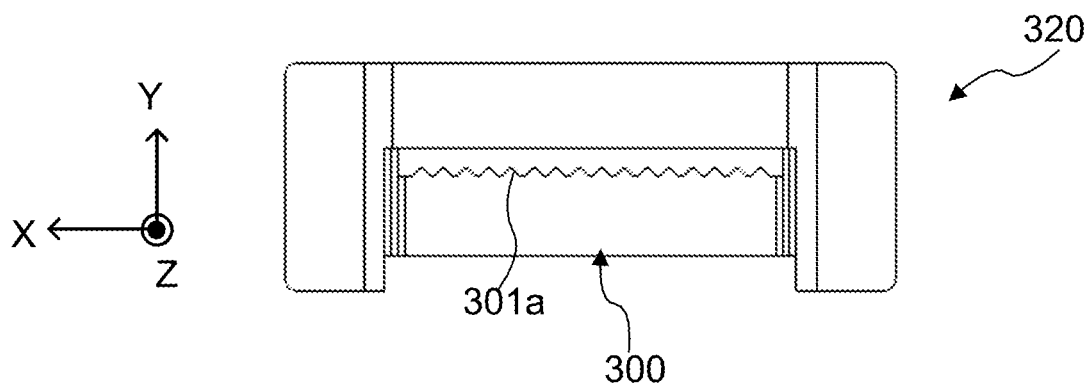
FIG. 12B is a rear view of the ferrule.
Figure 12C:
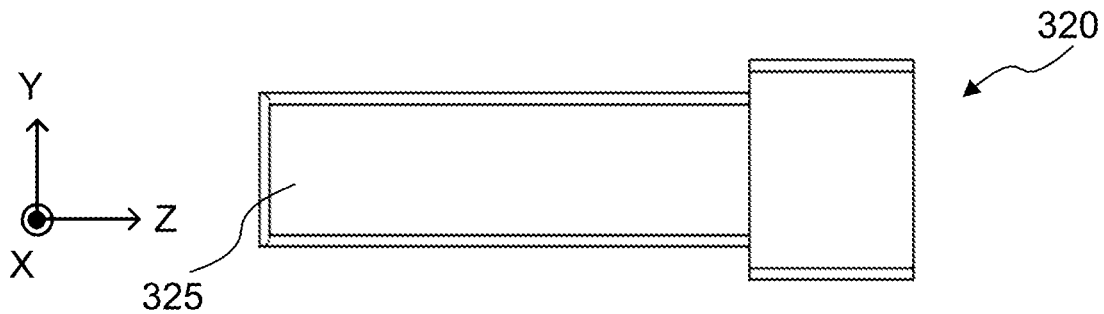
FIG. 12C is a right side view of the ferrule.
Figure 12D:
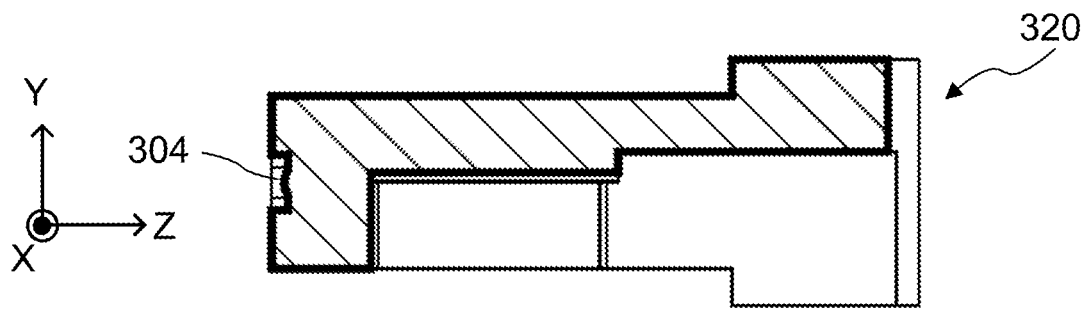
FIG. 12D is a cross-sectional view of the ferrule.

FIG. 10 is a perspective view of ferrule 320 according to Embodiment 3. FIG. 11A is a plan view of the ferrule and FIG. 11B is a bottom view of the ferrule. FIG. 12A is a front view of ferrule 320 according to Embodiment 3, FIG. 12B is a rear view of the ferrule, FIG. 12C is a right side view of the ferrule, and FIG. 12D is a cross-sectional view taken along line D-D shown in FIG. 12A.

Ferrule 320 according to Embodiment 3 includes engaging protrusion 325 and engaging recess 326. Engaging protrusion 325 and engaging recess 326 differ in the configuration thereof from engaging protrusion 305 and engaging recess 306 in ferrule 300 according to Embodiment 1. In the following, engaging protrusion 325 and engaging recess 326 will be described.

Engaging protrusion 325 has a shape substantially complementary to that of engaging recess 326 of the other facing ferrule (ferrule 320), and is disposed at a position substantially complementary to that of engaging recess 326. Engaging protrusion 325 thus can be engaged with engaging recess 326.

Specifically, as illustrated in FIG. 10, engaging protrusion 325 is a structure that protrudes from the front of ferrule 320 and extends in the Y direction. Engaging protrusion 325 is a structure, together with engaging recess 326 of the other ferrule that faces ferrule 320, for fixing the ferrules with respect to the X direction (in this case, the other ferrule is ferrule 320 because ferrules 320 are joined to each other in the present embodiment).

Engaging protrusion 325 is disposed apart from engaging recess 326 in the X direction (see FIG. 10). Specifically, in the present embodiment, engaging protrusion 325 and engaging recess 326 are disposed apart from each other in the X direction in such a way that both ends of the second surfaces arranged in the X direction are placed therebetween. In addition, in the present embodiment, engaging protrusion 325 has a substantially rectangular parallelepiped shape long in the Y direction. Engaging protrusion 325 may extend over the entire length of ferrule 320 from one end to the other end in the Y direction, or may extend over only a part of the entire length. In the present embodiment, engaging protrusion 325 extends over the entire length.

Engaging protrusion 325 includes inward restricting surface 325a.

On engaging protrusion 325, inward restricting surface 325a faces the inside (second surface 304 side) of the ferrule. Inward restricting surface 325a contacts outward restricting surface 326b (described below) of engaging recess 326 of the other facing ferrule (ferrule 320) to restrict the movement of the ferrule in the X direction.

As described above, engaging recess 326 has a shape substantially complementary to that of engaging protrusion 325 of the other facing ferrule (ferrule 320), and is disposed at a position substantially complementary to that of engaging protrusion 325.

As illustrated in FIG. 10, engaging recess 326 is depressed from the front of ferrule 320 and extends in the Y direction. Engaging recess 326 is disposed apart from engaging protrusion 315 in the X direction. Specifically, in the present embodiment, engaging recess 326 and engaging protrusion 325 are disposed apart from each other in the X direction in such a way that both ends of second surfaces 304 arranged in the X direction are placed therebetween. In addition, in the present embodiment, engaging recess 326 has a substantially rectangular parallelepiped shape long in the Y direction. Engaging recess 326 may extend over the entire length of ferrule 320 from one end to the other end in the Y direction, or may extend over only a part of the entire length. In the present embodiment, engaging recess 326 extends over the entire length in the Y direction.

As illustrated in FIGS. 10, 11A, and 11B, engaging recess 326 includes outward restricting surface 326b.

In engaging recess 326, outward restricting surface 326b faces the outside of the ferrule. Outward restricting surface 326b contacts inward restricting surface 325a of engaging protrusion 325 of the other facing ferrule (ferrule 310) to restrict the movement of the ferrule in the X direction.

In addition, ferrule 320 may include positioning protrusion 307 and positioning recess 308 as described in Embodiment 1 for fixing the ferrules with respect to the Y direction.

Connection Method

Figure 13:
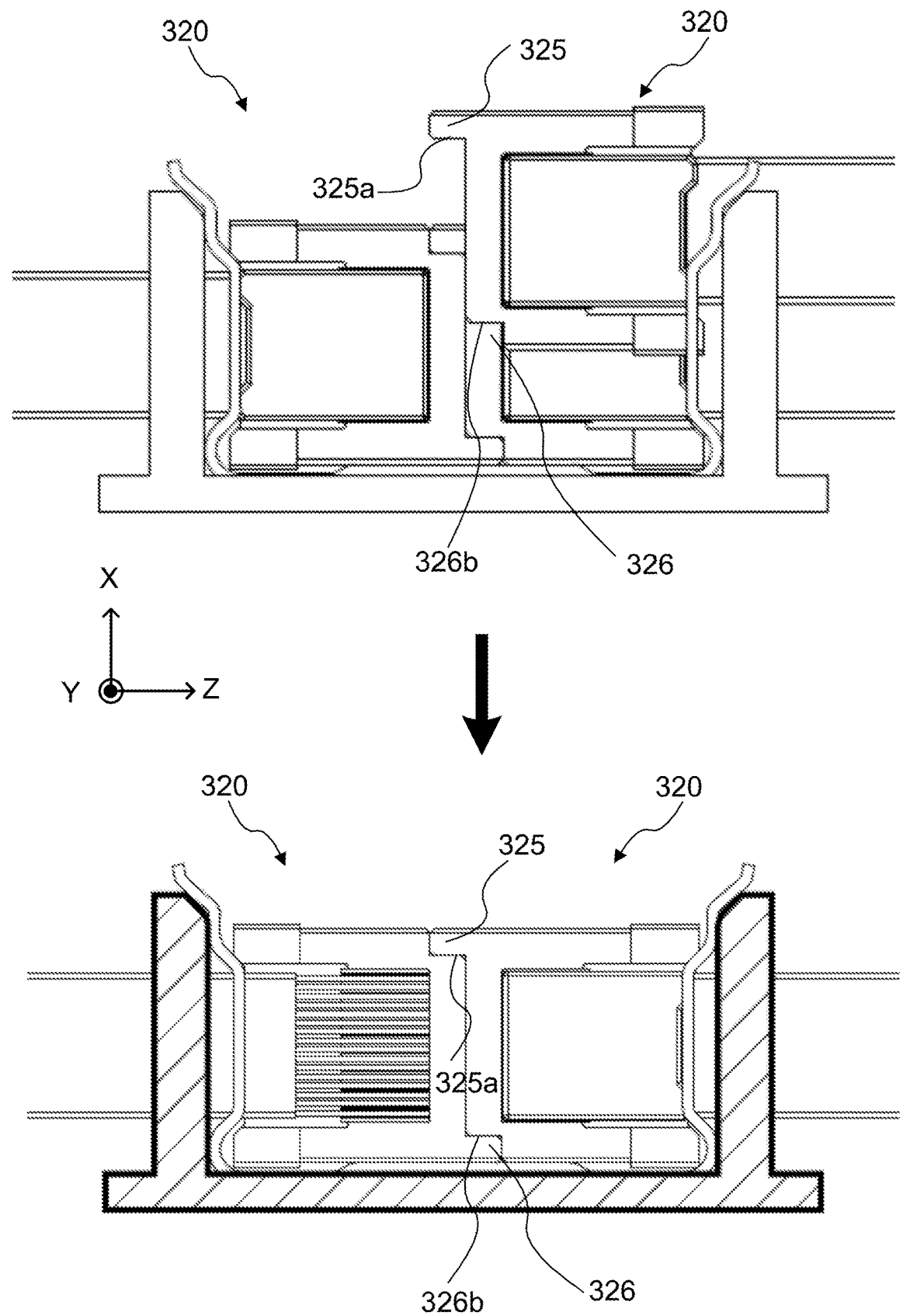
FIG. 13 illustrates how to connect the ferrules according to Embodiment 3 to each other.

FIG. 13 illustrates a process in which ferrule 320 is connected to another ferrule (a process in which ferrules 320 are connected to each other at the fronts thereof). In the lower drawing of FIG. 13, ferrule 320 on the left side is illustrated with the lid removed. As illustrated in FIG. 13, ferrules 320 can be joined to each other by fixing one ferrule 320 and moving the other ferrule 320 in the X direction.

In the joined state, ferrules 320 are fixed with respect to the X direction by inward restricting surface 325a of engaging protrusion 325 and outward restricting surface 326b of engaging recess 326.

In the above description, the ferrules are connected to each other by moving one of the ferrules in the X direction as an example. However, the direction in which the ferrule is moved may be any direction orthogonal to the Z direction. In other words, the ferrule may be moved in the Y direction.

Effects

Ferrule 320 according to the present embodiment includes engaging protrusion 325 and engaging recess 326, which extend in the Y direction and are disposed apart from each other in the X direction. This configuration can connect ferrules 320 to each other by moving at least one ferrule 320 in the X direction. As a result, ferrules 320 can be connected to each other even in a small space.

Embodiment 4

Configuration of Ferrule

In an optical connector module and an optical connector according to Embodiment 4, only the configuration of a ferrule is different from the optical connector module and the optical connector according to Embodiment 1. Therefore, only ferrules 330 and 340 according to Embodiment 4 will be described in the following description. Regarding ferrules 330 and 340 according to Embodiment 4, the same components as those of ferrule 300 according to Embodiment 1 are designated by the same reference numerals and the description thereof will be omitted. In Embodiments 1 to 3, ferrules having the same shape are joined to each other at their front. However, in Embodiment 4, two ferrules having different shapes, namely ferrule 330 and ferrule 340, are connected to each other at their front. In the following, ferrules 330 and 340 will be described.

Figure 14:
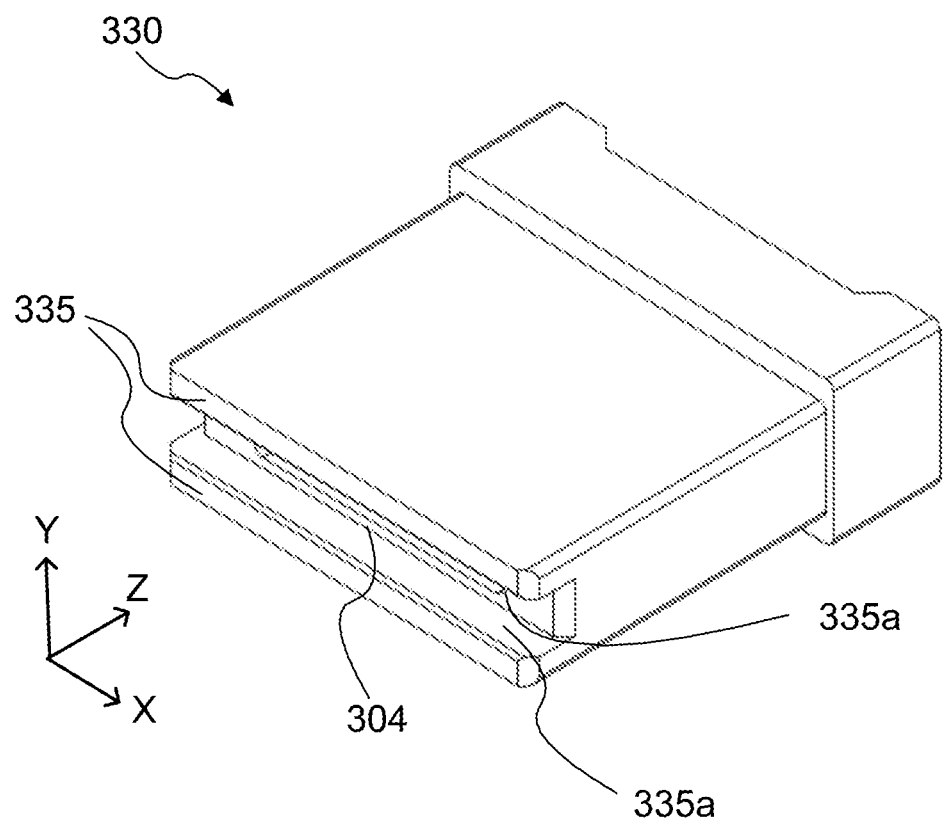
FIG. 14 is a perspective view of a ferrule according to Embodiment 4.
Figure 15A:
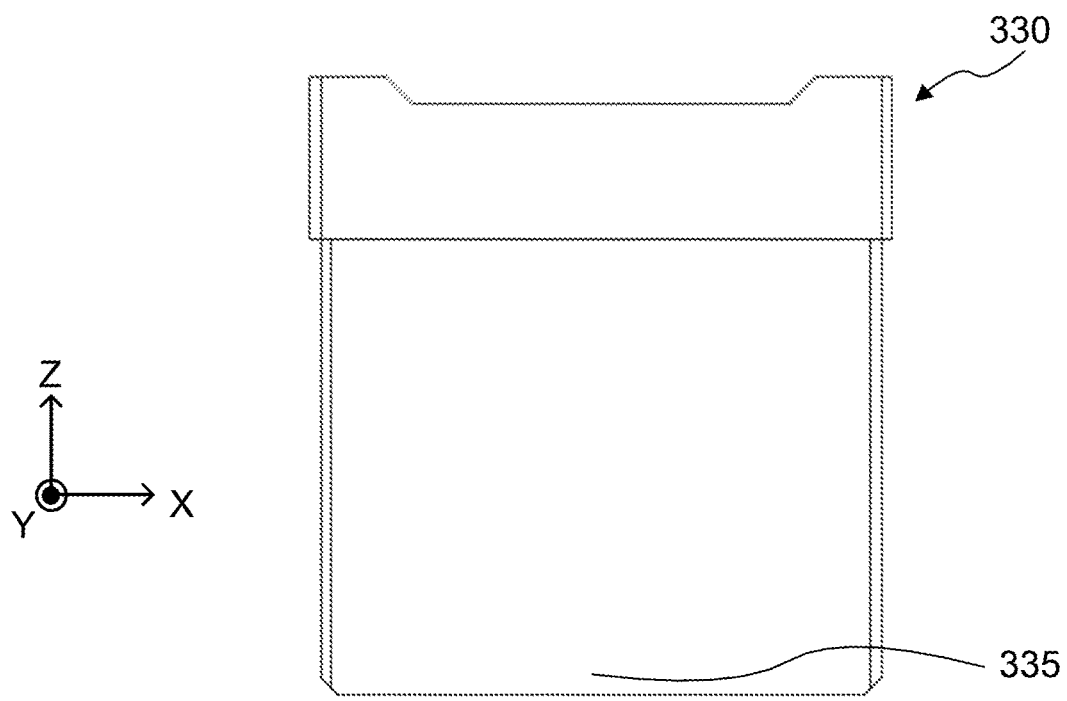
FIG. 15A is a plan view of the ferrule according to Embodiment 4.
Figure 15B:
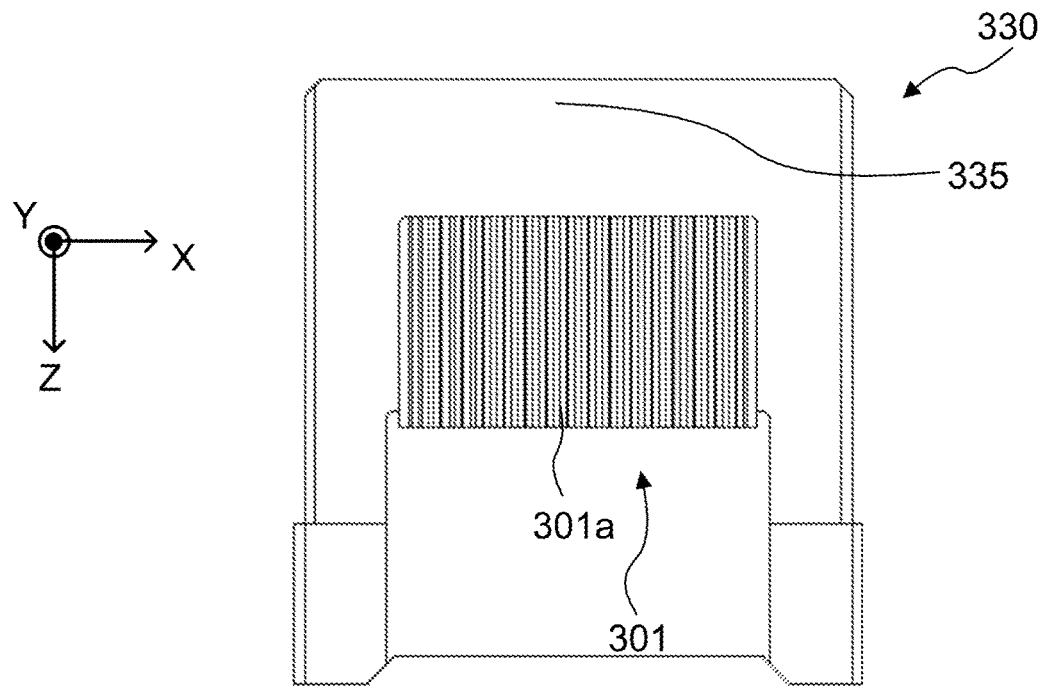
FIG. 15B is a bottom view of the ferrule.
Figure 16A:
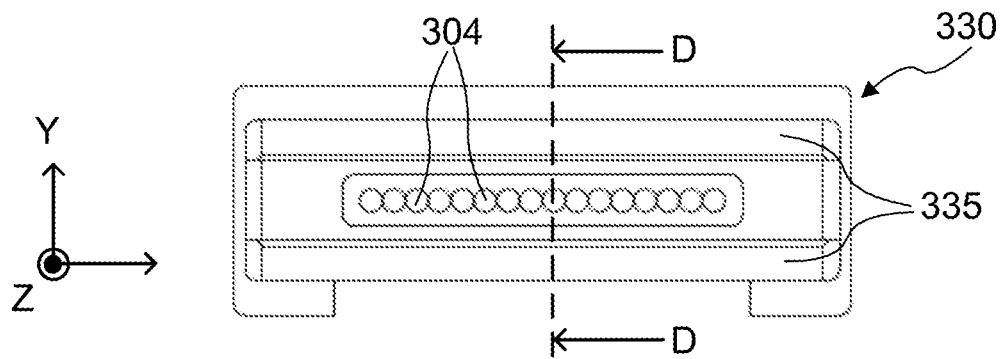
FIG. 16A is a front view of the ferrule according to Embodiment 4.
Figure 16B:
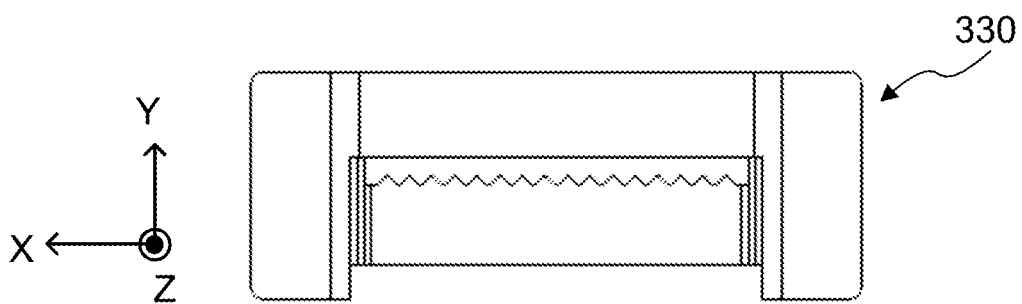
FIG. 16B is a rear view of the ferrule.
Figure 16C:
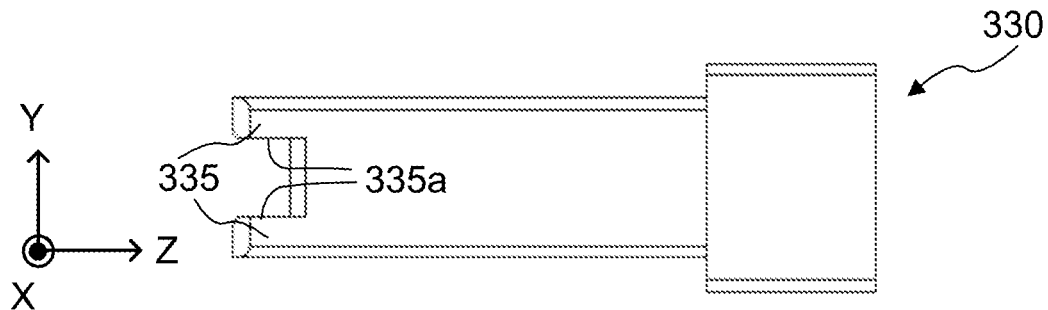
FIG. 16C is a right side view of the ferrule.
Figure 16D:
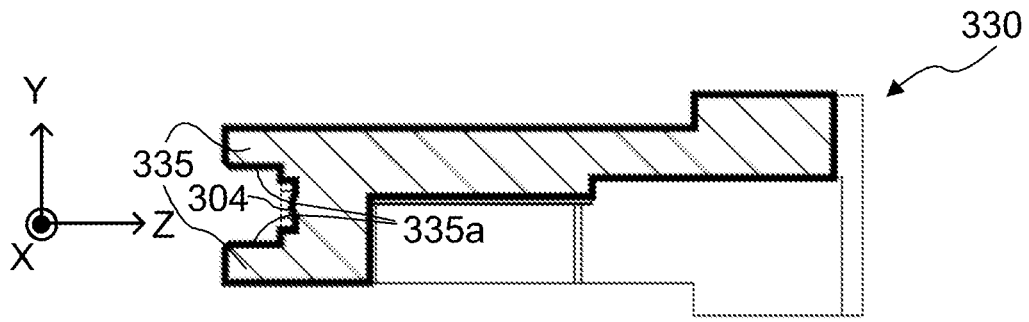
FIG. 16D is a cross-sectional view of the ferrule.

FIG. 14 is a perspective view of ferrule 330 according to Embodiment 4. FIG. 15A is a plan view of the ferrule and FIG. 15B is a bottom view of the ferrule. FIG. 16A is a front view of ferrule 330 according to Embodiment 4, FIG. 16B is a rear view of the ferrule, FIG. 16C is a right side view of the ferrule, and FIG. 16D is a cross-sectional view taken along line D-D shown in FIG. 16A.

Ferrule 330 includes two engaging protrusions 335. As illustrated in FIG. 14, each of two engaging protrusions 335 is a structure that protrudes from the front of ferrule 330 and extends in the X direction. Two engaging protrusions 335 are structures, together with two engaging recesses 346 of the other facing ferrule (ferrule 340 described below), for fixing the ferrules with respect to the X direction. Therefore, it is preferred that each of two engaging protrusions 335 of ferrule 330 has a shape substantially complementary to that of corresponding one of engaging recesses 346 of ferrule 340 facing ferrule 330, and is disposed at a position substantially complementary to that of the engaging recess 346.

As illustrated in FIG. 14, two engaging protrusions 335 are disposed apart from each other in the Y direction. Specifically, in the present embodiment, two engaging protrusions 335 are disposed apart from each other in the Y direction in such a way that second surfaces 304 arranged in the X direction are placed therebetween. In addition, in the present embodiment, each of two engaging protrusions 335 has a substantially rectangular parallelepiped shape long in the X direction. Each of two engaging protrusions 335 may extend over the entire length of ferrule 330 from one end to the other end in the X direction, or may extend over only a part of the entire length. In the present embodiment, engaging protrusion 335 extends over the entire length.

Two engaging protrusions 335 each include inward restricting surface 335a.

On engaging protrusion 335, inward restricting surface 335a faces the inside (second surface side) of the ferrule. Inward restricting surface 335a contacts outward restricting surface 346b (described below) of engaging recess 346 of the other facing ferrule (ferrule 340) to restrict the movement of the ferrule in the Y direction.

In the above description, the number of engaging protrusions 335 is two, but the number may be more than two as long as engaging protrusions 335 can engage with engaging recesses 346.

Figure 17:
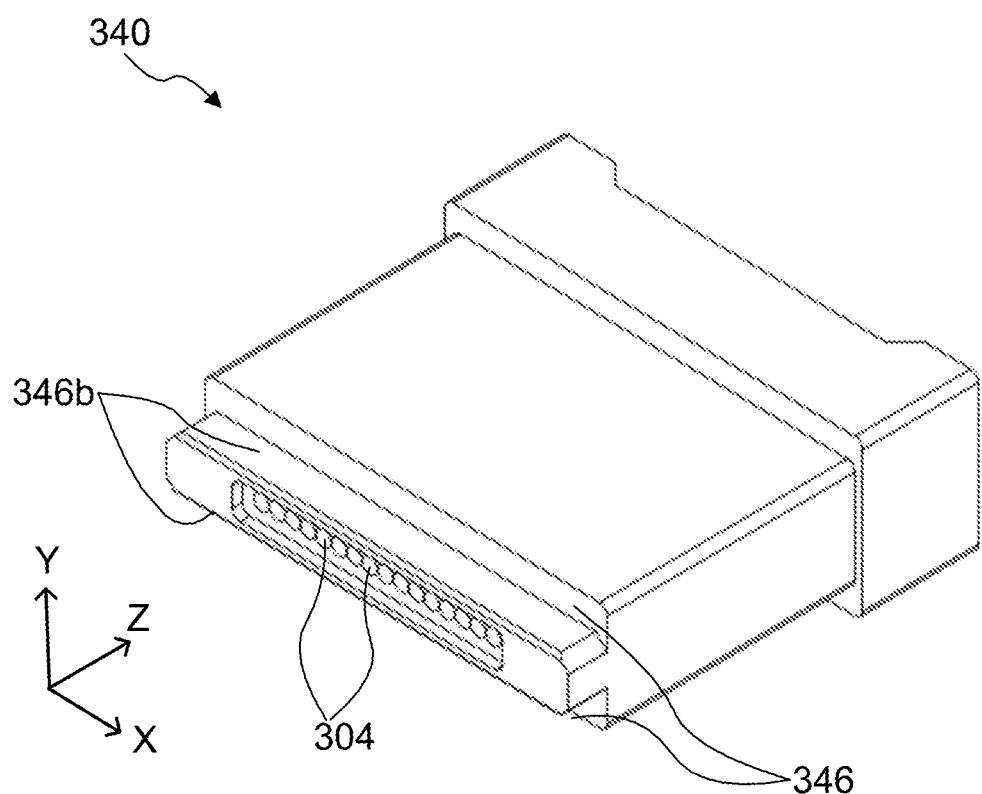
FIG. 17 is a perspective view of another ferrule according to Embodiment 4.
Figure 18A:
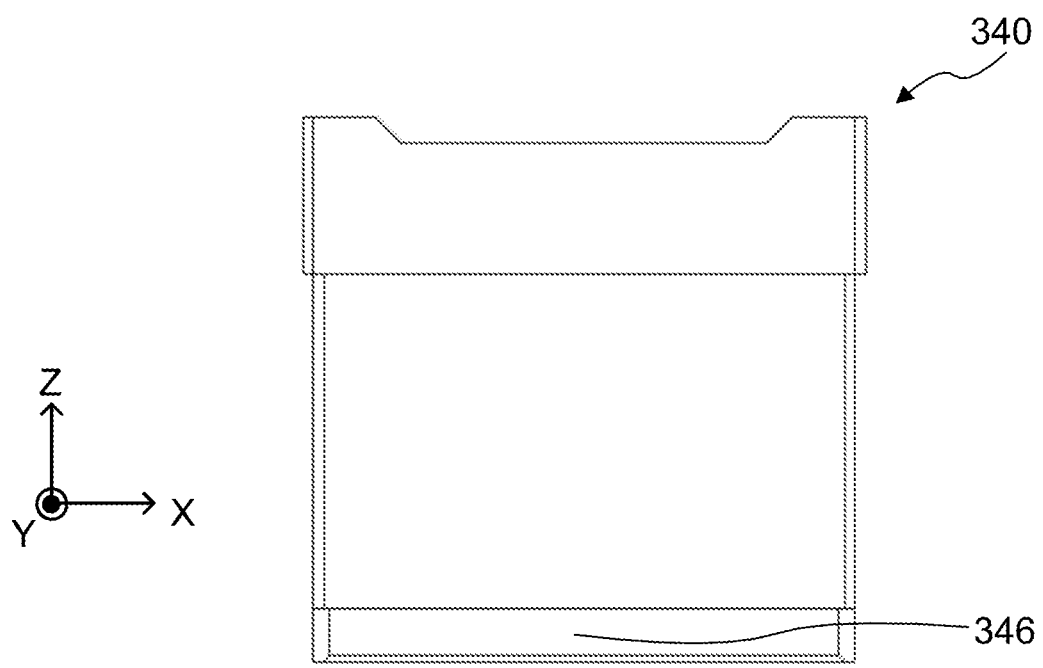
FIG. 18A is a plan view of the ferrule according to Embodiment 4.
Figure 18B:
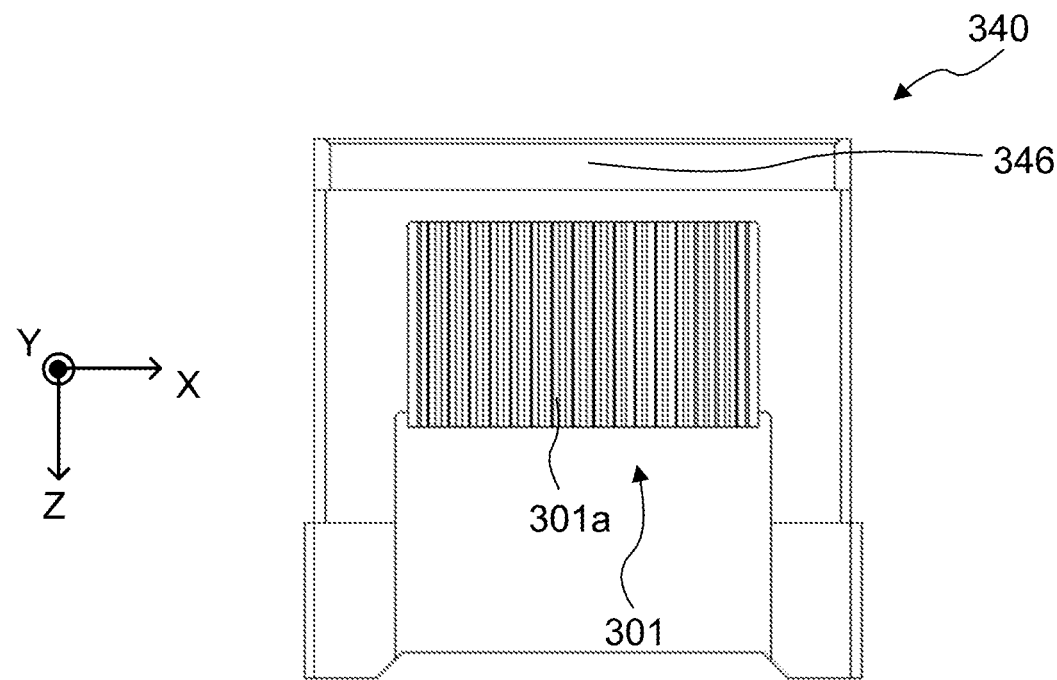
FIG. 18B is a bottom view of the ferrule.
Figure 19A:
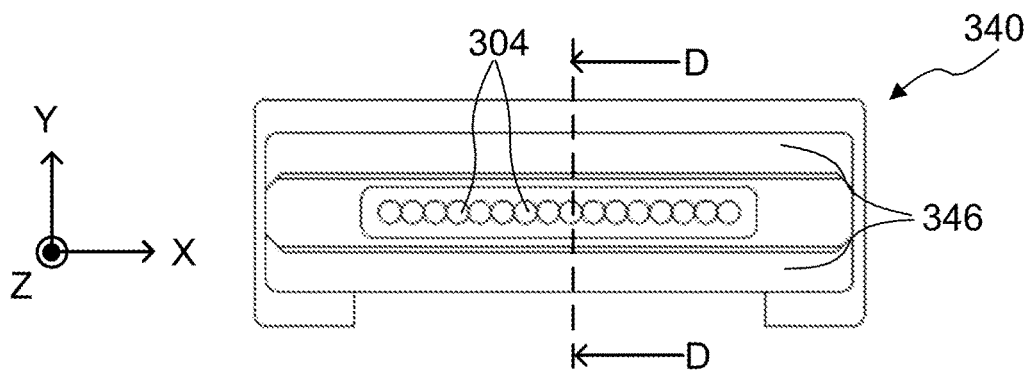
FIG. 19A is a front view of the ferrule according to Embodiment 4.
Figure 19B:
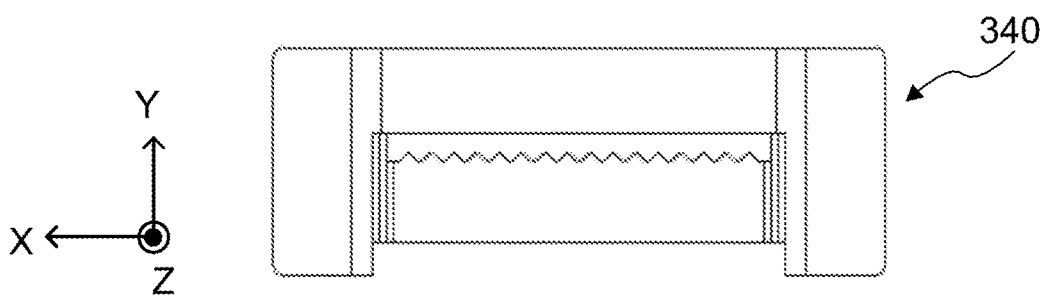
FIG. 19B is a rear view of the ferrule.
Figure 19C:
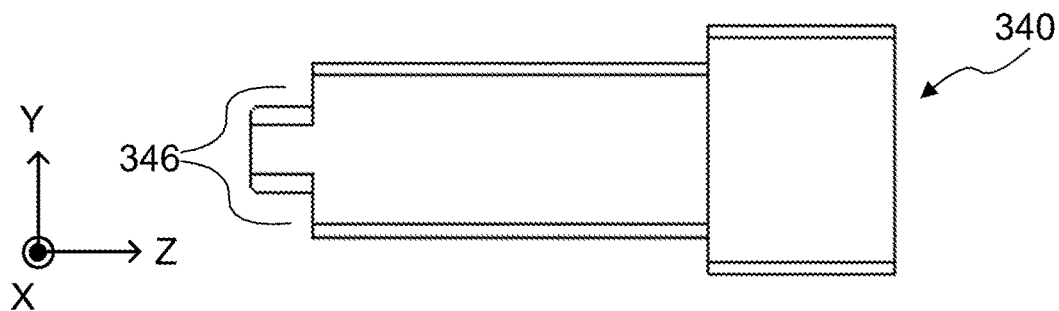
FIG. 19C is a right side view of the ferrule.
Figure 19D:
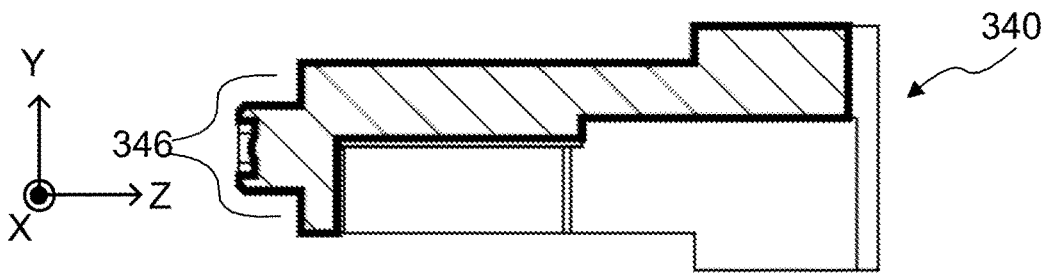
FIG. 19D is a cross-sectional view of the ferrule.

FIG. 17 is a perspective view of ferrule 340 according to Embodiment 4. FIG. 18A is a plan view of the ferrule and FIG. 18B is a bottom view of the ferrule. FIG. 19A is a front view of ferrule 340 according to Embodiment 4, FIG. 19B is a rear view of the ferrule, FIG. 19C is a right side view of the ferrule, and FIG. 19D is a cross-sectional view taken along line D-D shown in FIG. 19A.

As described above, each of two engaging recesses 346 has a shape substantially complementary to that of corresponding one of two engaging protrusions 335 of the other facing ferrule (ferrule 330), and is disposed at a position substantially complementary to that of the engaging protrusion 335.

As illustrated in FIG. 17, ferrule 340 includes two engaging recesses 346. As illustrated in FIG. 17, each of two engaging recesses 346 is depressed from the front of ferrule 340 and extends in the X direction. Two engaging recesses 346 are disposed apart from each other in the Y direction. Specifically, in the present embodiment, two engaging recesses 346 are disposed apart from each other in the Y direction in such a way that second surfaces 304 arranged in the X direction are placed therebetween. In addition, in the present embodiment, engaging recess 346 has a substantially rectangular parallelepiped shape long in the X direction. Engaging recess 346 may extend over the entire length of ferrule 340 from one end to the other end in the X direction, or may extend over only a part of the entire length. In the present embodiment, engaging recess 346 extends over the entire length in the X direction.

Two engaging recesses 346 each include outward restricting surface 346b.

In engaging recess 346, outward restricting surface 346b faces the outside of the ferrule. Outward restricting surface 346b contacts inward restricting surface 335a (see FIG. 14) of engaging protrusion 335 of the other facing ferrule (ferrule 330) to restrict the movement of the ferrule in the Y direction.

In addition, ferrules 330 and 340 may include positioning protrusion 307 and positioning recess 308 as described in Embodiment 1.

Connection Method

Figure 20:
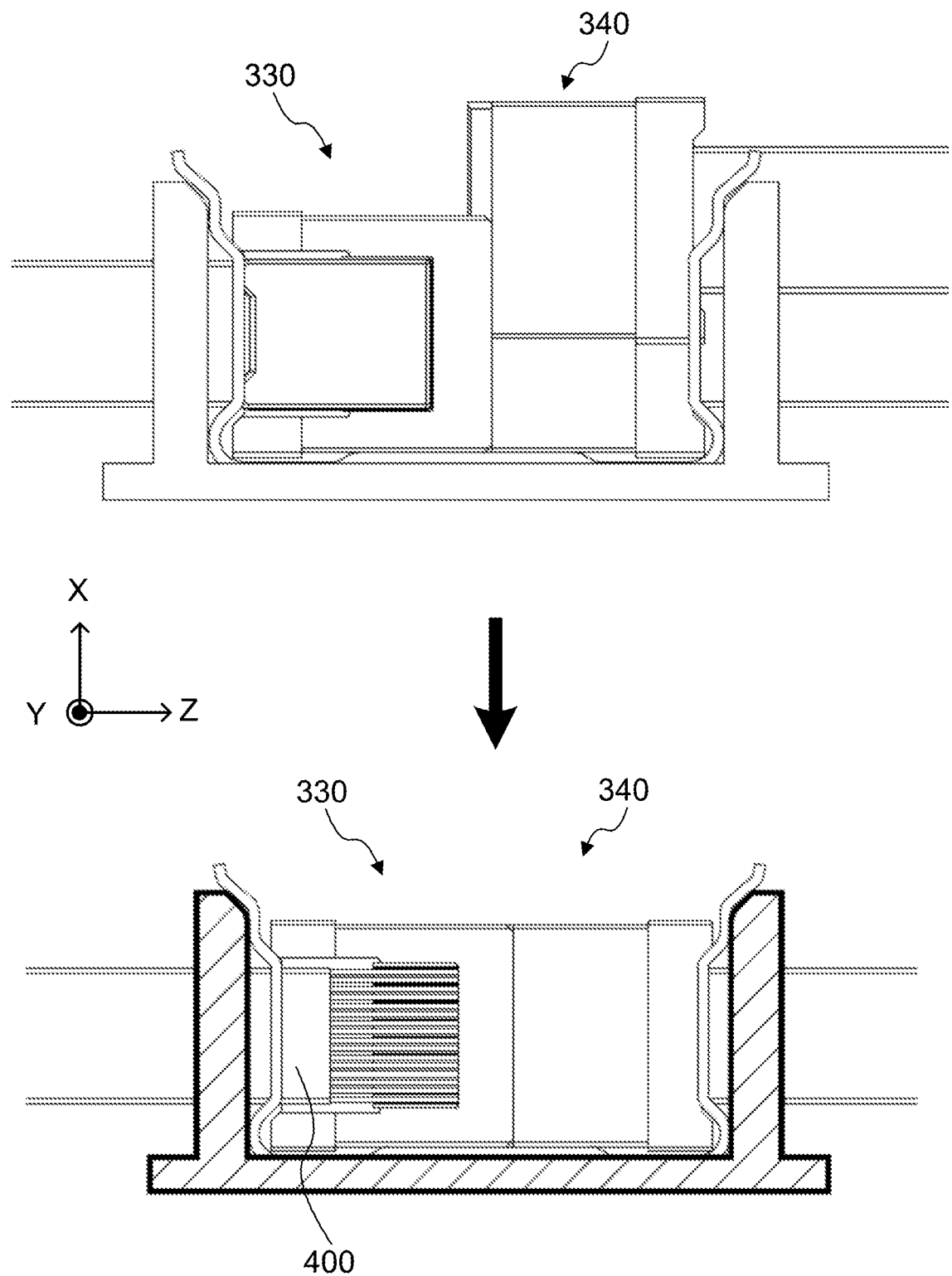
FIG. 20 illustrates how to connect the ferrules according to Embodiment 4 to each other.

FIG. 20 illustrates a process in which ferrule 330 and ferrule 340 are connected to each other. In the lower drawing of FIG. 20, the ferrule on the left side is illustrated with the lid removed. As illustrated in FIG. 20, ferrules 330 and 340 can be joined to each other by fixing ferrule 330 and moving ferrule 340 in the X direction. As a result, optical transmission members 400 can be optically connected. Alternatively, ferrule 340 may be fixed and ferrule 330 is moved.

While ferrule 340 is moved, engaging recess 346 of ferrule 340 moves so as to slide along engaging protrusion 335 of ferrule 330. In other words, engaging protrusion 335 and engaging recess 346 serve as guides for preventing misalignment in the Y direction when ferrule 340 is moved in the X direction.

In the connected state, ferrules 330 and 340 are fixed with respect to two direction in the Y direction by two inward restricting surfaces 335a of two engaging protrusions 335 and two outward restricting surfaces 346b of two engaging recesses 346.

Effects

Ferrule 330 according to the present embodiment includes two engaging protrusions 335, which extend in the X direction and are disposed apart from each other in the Y direction. In addition, ferrule 340 according to the present embodiment includes two engaging recesses 346, which extend in the X direction and are disposed apart from each other in the Y direction. This configuration can connect ferrules 330 and 340 to each other by moving at least one of the ferrules in the X direction. As a result, the two ferrules can be connected to each other even in a small space.

INDUSTRIAL APPLICABILITY

The present invention is particularly advantageous for, for example, installing in a narrow space a ferrule (optical connector) including an optical transmission member.

REFERENCE SIGNS LIST

100 Optical connector module
110 Adapter
111 Base
112 First wall
113 Second wall
114, 124 Slit
120 Elastic body
121 Base plate
122 First plate
123 Second plate
200 Optical connector
300, 310, 320, 330, 340 Ferrule
301 Optical transmission member holding part
301a Groove
302 First surface
303 Light transmitting wall
304 Second surface
305, 315, 325, 335, 345 Engaging protrusion
305a, 316a, 325a, 335a Inward restricting surface
306, 316, 326, 336, 346 Engaging recess
306b, 315b, 316b, 325b, 326b, 346b Outward restricting surface
307 Positioning protrusion
308 Positioning recess
400 Optical transmission member

The invention claimed is:

1. A ferrule configured to hold a plurality of optical transmission members and to be connectable to an other ferrule, the ferrule comprising:
a first surface facing an end of the plurality of optical transmission members when the plurality of optical transmission members are held; and
a plurality of second surfaces disposed opposite to the first surface in the ferrule; and
an engaging protrusion and an engaging recess each configured to engage with the other ferrule to fix a position of the ferrule relative to the other ferrule with respect to a Y direction perpendicular to a Z direction, wherein
the plurality of optical transmission members extend in the Z direction,
the ferrule is further configured to be moved in a direction orthogonal to the Z direction to be connected to the other ferrule, and
the engaging protrusion and the engaging recess are both disposed at a front of the ferrule and disposed apart from each other in the Y direction, and the plurality of the second surfaces are disposed in the front of the ferrule.

2. The ferrule according to claim 1, further comprising:
a positioning protrusion and a positioning recess each for fixing a position of the ferrule relative to the other ferrule with respect to an X direction perpendicular to the Z direction, wherein
the positioning protrusion and the positioning recess are both disposed at a front of the ferrule.

3. The ferrule according to claim 1, further comprising:
two or more engaging protrusions configured to engage with the other ferrule to fix a position of the ferrule relative to the other ferrule with respect to a Y direction perpendicular to the Z direction, wherein the two or more engaging protrusions are disposed at a front of the ferrule and disposed apart from each other in the Y direction; or
two or more engaging recesses configured to engage with the other ferrule to fix the position of the ferrule relative to the other ferrule with respect to the Y direction, wherein the two or more engaging recesses are disposed at the front of the ferrule and disposed apart from each other in the Y direction,
wherein the plurality of the second surfaces are disposed in the front of the ferrule.

4. The ferrule according to claim 3, further comprising:
a positioning protrusion or a positioning recess disposed at the front of the ferrule, wherein
the positioning protrusion and the positioning recess are each for fixing the position of the ferrule relative to the other ferrule with respect to the X direction.

5. An optical connector, comprising:
the ferrule according to claim 1; and
a plurality of optical transmission members.

6. A ferrule configured to hold a plurality of optical transmission members and to be connectable to an other ferrule, the ferrule comprising:
a first surface facing an end of the plurality of optical transmission members when the plurality of optical transmission members are held;
a plurality of second surfaces disposed opposite to the first surface in the ferrule; and
an engaging protrusion and an engaging recess each configured to engage with the other ferrule to fix a position of the ferrule relative to the other ferrule with respect to a Y direction perpendicular to an X direction, wherein
the plurality of second surfaces are arranged in the X direction,
the ferrule is further configured to be moved in the X direction to be connected to the other ferrule, and
the engaging protrusion and the engaging recess are both disposed at a front of the ferrule and disposed apart from each other in the Y direction, and the plurality of the second surfaces are disposed in the front of the ferrule.

7. The ferrule according to claim 6, further comprising:
an engaging protrusion and an engaging recess each configured to engage with the other ferrule to fix a position of the ferrule relative to the other ferrule with respect to the X direction, wherein
the engaging protrusion and the engaging recess are both disposed at a front of the ferrule and disposed apart from each other in the X direction, and
the plurality of the second surfaces are disposed in the front of the ferrule.

8. The ferrule according to claim 7, further comprising:
a positioning protrusion and a positioning recess each for fixing the position of the ferrule with respect to a Y direction perpendicular to the X direction, wherein
the positioning protrusion and the positioning recess are both disposed at the front of the ferrule.

9. An optical connector, comprising:
the ferrule according to claim 6; and
a plurality of optical transmission members.

10. An optical connector module, comprising:
an optical connector including a ferrule and a plurality of optical transmission members;
an elastic member for fixing a position of the optical connector; and
an adapter for fixing a position of the elastic member,
wherein the ferrule is configured to hold the plurality of optical transmission members and to be connectable to an other ferrule,
wherein the ferrule comprises:
   a first surface facing an end of the plurality of optical transmission members when the plurality of optical transmission members are held; and
   a plurality of second surfaces disposed opposite to the first surface in the ferrule, and
wherein
   the plurality of optical transmission members extend in a Z direction, and
   the ferrule is further configured to be moved in a direction orthogonal to the Z direction to be connected to the other ferrule.

11. An optical connector module, comprising:
an optical connector including a ferrule and a plurality of optical transmission members;
an elastic member for fixing a position of the optical connector; and
an adapter for fixing a position of the elastic member,
wherein the ferrule is configured to hold the plurality of optical transmission members and to be connectable to an other ferrule,
wherein the ferrule comprises:
   a first surface facing an end of the plurality of optical transmission members when the plurality of optical transmission members are held; and
   a plurality of second surfaces disposed opposite to the first surface in the ferrule, and
wherein
   the plurality of second surfaces are arranged in an X direction, and
   the ferrule is further configured to be moved in the X direction to be connected to the other ferrule.

* * * * *